US00RE37610E

(19) United States
(12) Reissued Patent
Tsuchiya et al.

(10) Patent Number: US RE37,610 E
(45) Date of Reissued Patent: Mar. 26, 2002

(54) RUNNING GUIDE APPARATUS FOR VEHICLE CAPABLE OF KEEPING SAFETY AT PASSING THROUGH NARROW PATH AND THE METHOD THEREOF

(75) Inventors: Hideaki Tsuchiya; Keiji Hanawa; Keiji Saneyoshi, all of Tokyo-to (JP)

(73) Assignee: Fuji Jukogyo Kabushiki Kaisha, tokyo-To (JP)

(21) Appl. No.: 09/102,880

(22) Filed: Jun. 24, 1998

Related U.S. Patent Documents

Reissue of:
(64) Patent No.: 5,530,420
Issued: Jun. 25, 1996
Appl. No.: 08/364,104
Filed: Dec. 27, 1994

(30) Foreign Application Priority Data

Dec. 27, 1993 (JP) ..... 5-330191

(51) Int. Cl.[7] ..... B60Q 1/00; H04N 7/18
(52) U.S. Cl. ..... 340/435; 340/901; 340/903; 180/167; 701/28; 348/116; 348/118; 348/42; 348/148; 348/135; 382/106
(58) Field of Search ..... 340/435, 436, 340/903, 901; 180/169, 167; 701/301, 28; 348/42, 47, 51, 135, 143, 113, 148, 169, 116, 118; 382/106

(56) References Cited

U.S. PATENT DOCUMENTS 4,257,703 A * 3/1981 Goodrich ..... 56/28
4,851,901 A * 7/1989 Iwasaki ..... 348/42
4,942,539 A * 7/1990 McGee et al. ..... 348/42
5,283,640 A * 2/1994 Tilton ..... 348/42
5,304,980 A * 4/1994 Mackawa ..... 340/903
5,307,136 A * 4/1994 Saneyoshi ..... 180/167
5,410,346 A * 4/1995 Saneyoshi et al. ..... 348/116
5,461,357 A * 10/1995 Yoshioka et al. ..... 340/435

* cited by examiner

*Primary Examiner*—Donnie L. Crosland
(74) *Attorney, Agent, or Firm*—Smith, Gambrell & Russell, LLP

(57) ABSTRACT

A running guide apparatus for a vehicle includes stereoscopic picture processing element for processing a pair of stereoscopic pictures of an object outside a vehicle imaged by a imaging system mounted on the vehicle, construction detection element for detecting a plurality of various constructions by using three dimensional position data calculated with each portion of the object corresponding to the distance distribution data from the stereoscopic picture processing element; gap distance calculation element for respectively calculating the nearest distance as right and left gap distances each between an extended line of right or left side of the vehicle and each of ends on the vehicle side of the plurality of various constructions detected by the construction detection element; and information element for informing the driver of data related to the right and left gap data calculated by the gap distance calculation element; so as to obtain a distance distribution of an entire picture in dependency upon a discrepancy amount positions corresponding to of the pair of the stereoscopic pictures in accordance with a principle of a triangulation.

24 Claims, 30 Drawing Sheets

RUNNING GUIDE APPARATUS FOR VEHICLE CAPABLE OF KEEPING SAFETY AT PASSING THROUGH NARROW PATH AND THE METHOD THEREOF

Matter enclosed in heavy brackets [ ] appears in the original patent but forms no part of this reissue specification; matter printed in italics indicates the additions made by reissue.

BACKGROUND OF THE INVENTION

The present invention relates to a running guide apparatus for a vehicle capable of keeping a safety at passing through a narrow path, and of decreasing a burden of a driver when the vehicle is passing through the narrow path.

A vehicle such as an automobile conventionally has a sensor in which a touch switch is turned on when a corner pole or bar-shaped member touches an obstacle such as a wall, guardrail, pole and parked vehicle, as disclosed in an official gazette of Japanese Utility Model Laid-open No. 5-68742 (1993), in order to compensate a sense of a driver, thereby recognizing a gap between the vehicle and obstacles existing in right and left side of the vehicle.

Recently, a technology is developed for decreasing the burden of the driver when the vehicle passes through the narrow path in the manner that an ultrasonic sensor arranged on a side surface or four corners of the vehicle irradiates an ultrasonic wave, receives a reflected wave from the obstacle, and measures a distance of the gap, thereby informing the driver of the measured distance.

However, since the driver needs a lot of skill to operate the vehicle with the above-mentioned corner pole attached on an outside of the body of the vehicle as a sign, it is impossible to obtain an effect to decrease the burden of the driver. In a contact type such as a feeler sensor, the driver can not operate a steering wheel sufficiently after touching the obstacle because he can not recognize the position before touching the object.

Furthermore, a supersonic technology can not teach the driver a positional relationship of the obstacle because of a deterioration of a spatial resolving power, and has an object dependence in which a radiated ultrasonic does not return from clothes of walkers and slippery walls. Accordingly, it is quite difficult to correspond to various structures existing on a road.

SUMMARY OF THE INVENTION

In view of the above-mentioned condition, an object of the present invention is to provide to a running guide apparatus for a vehicle capable of keeping a safety at passing through a narrow path and decreasing a burden of a driver by informing the driver of a gap between the detected structure and own vehicle body in dependency upon a proper detection of various constructions existing in the advancing direction of the vehicle before the vehicle is passing through the narrow path.

The running guide apparatus according to the present invention comprises stereoscopic picture processing means for processing a pair of stereoscopic pictures of an object outside a vehicle imaged by a imaging system mounted on the vehicle so as to obtain a distance distribution of an entire picture in dependency upon a discrepancy amount positions corresponding to the pair of the stereoscopic pictures in accordance with a principle of a triangulation;

construction detection means for detecting a plurality of various constructions by using three dimensional position data calculated with each portion of the object corresponding to the distance distribution data from the stereoscopic picture processing means, gap distance calculation means for respectively calculating the nearest distance as right and left gap distances each between an extended line of right or left side of the vehicle and each of ends on the vehicle side of the plurality of various constructions detected by the construction detection means, and information means for informing the driver of data related to the right and left gap data calculated by the gap distance calculation means.

In the present invention, after the distance distribution data in the entire picture are obtained by the principle of the triangulation in dependency upon the discrepancy amount of the positions corresponding to the pair of the stereoscopic pictures which are stereoscopically imaged from the objects around the vehicle, the three-dimensional positions of respective portions corresponding to the distance distribution data, thereby detecting the construction by using the three-dimensional position data. The calculation means respectively calculates the nearest distance as the right and left gap distances between an extended line of right or left side of the vehicle and each of ends on the vehicle side of the plurality of various constructions which has been previously detected, in order to inform the driver of the right and left gap distance data.

As described above, the present invention obtains the distance distribution in the entire pictures in dependency on the discrepancy amount between the positions corresponding to the pair of the stereoscopic pictures imaging the objects around the vehicle, calculates the three-dimensional position of each portion of the object corresponding to the distance distribution data, and detects a plurality of the constructions by using the calculated three-dimensional position data. The apparatus of the present invention further calculates as the right and left gap distances of the nearest distance between the ends on the vehicle side of the detected plurality of the objects and the extended line of the sides of the vehicle, respectively, and informs the driver of the calculated right and left gap distance data. Accordingly, it is possible to properly inform the driver of the gap distance between own vehicle body and the various constructions existing in the advancing direction before the vehicle passes through the narrow path after precisely detecting, thereby obtaining extremely excellent effects such as a decrease of the burden of the driver and an insurance against the risk.

DETAILED DESCRIPTION OF THE PREFERRED EMBODIMENTS

There will be described in detail a running guide apparatus for a vehicle according to preferred embodiments of the present invention in reference with the attached drawings.

Figure 1:
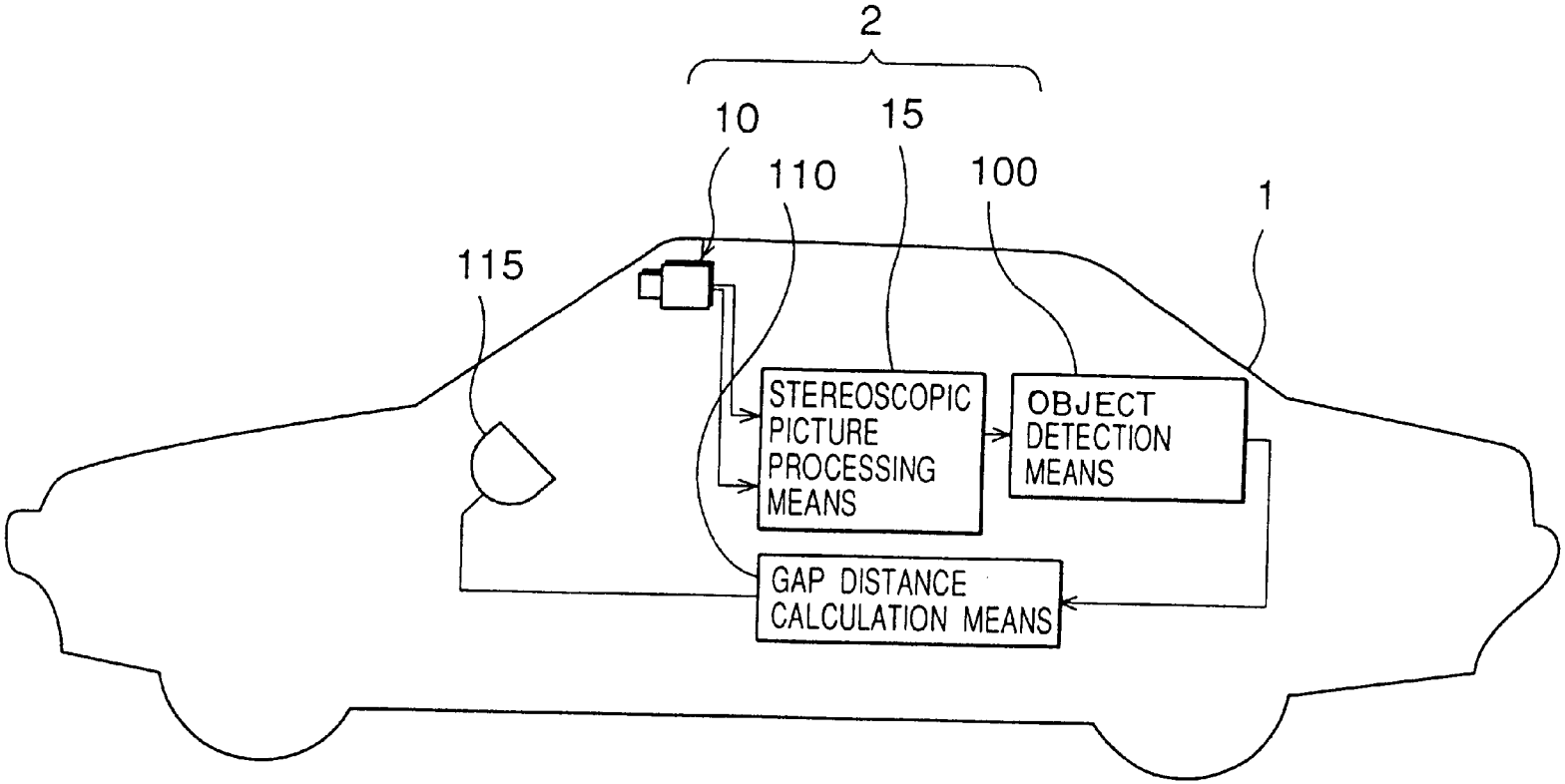
FIG. 1 is a view of entire constitution of a running guide apparatus.

In FIG. 1, numeral 1 denotes a vehicle such as an automobile, and the vehicle 1 has a running guide apparatus 2 having a function of an active drive assist (ADA) system to perform a high class assist control for a driver, thereby ensuring a risk by decreasing a burden of the driver when the vehicle passes through a narrow path in which wall, guardrails, electric (telephone) poles and parking cars exist.

The running guide apparatus 2 comprises a stereoscopic optical system 10 having a pair of cameras in right and left positions as an imaging system for imaging objects around the vehicle, stereoscopic picture processing means 15 for calculating a three-dimensional distance distribution in the entire picture by processing a pair of pictures imaged by the right and left cameras of the stereoscopic optical system 10, construction detection means 100 for detecting at a high speed a three-dimensional position of the continuous construction as a boundary of the road such as the wall and the guardrail and objects on the road such as .other vehicles, walkers and buildings in dependency on the distance distribution data supplied from the stereoscopic picture processing means 15, gap distance calculation means 110 for calculating as a gap distance a nearest distance in right and left sides of the vehicle between an extended line of the sides of the vehicle body and ends of the wall or construction detected by the construction detection means, and information means 115 for informing the driver of the gap distance data calculated by the gap distance calculation means 110 with respect to the right and left sides of the vehicle.

Figure 2:
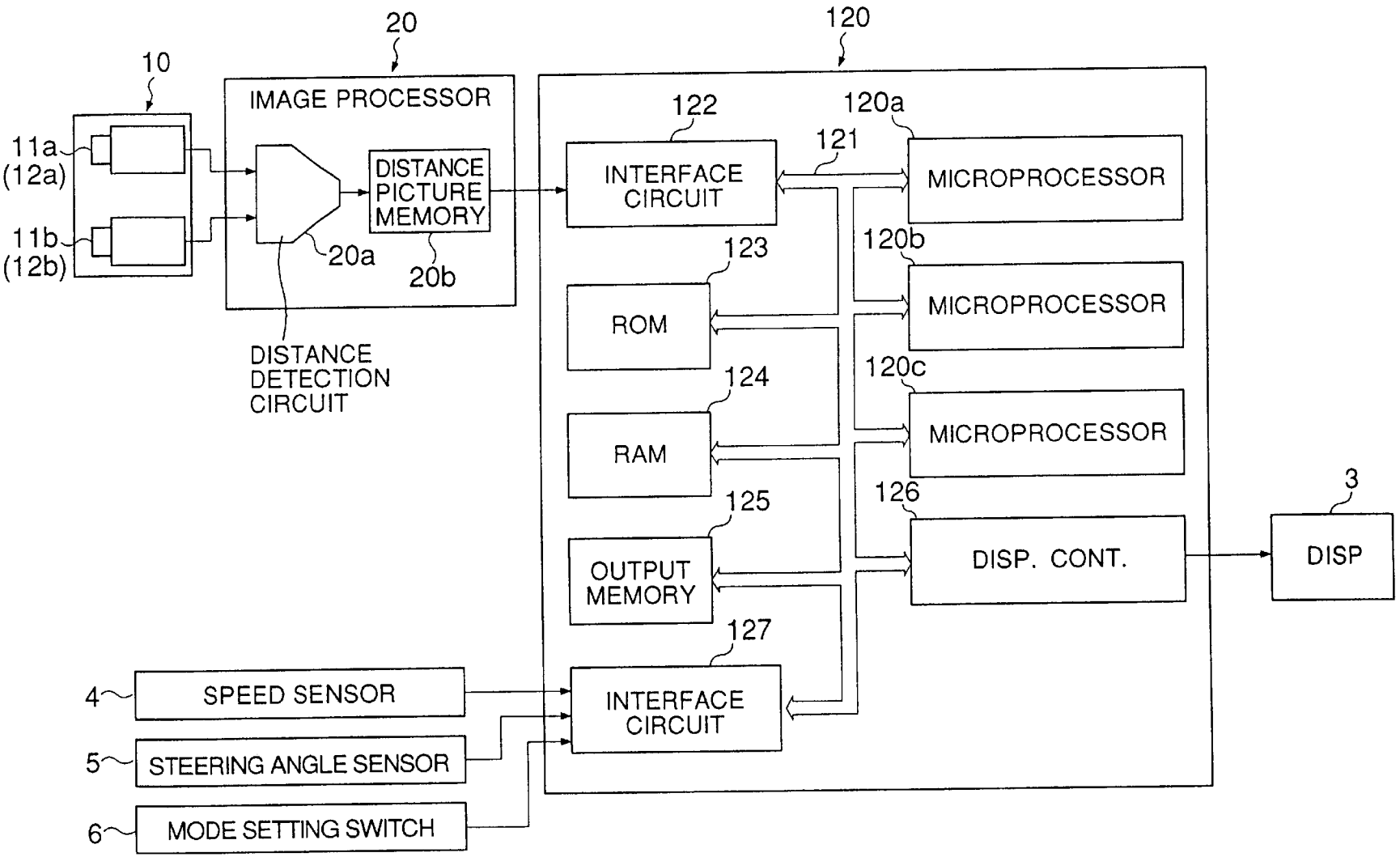
FIG. 2 is a circuit block diagram showing the running guide apparatus.

FIG. 2 is a circuit block diagram showing a hardware structure of the running guide apparatus 2. The stereoscopic optical system 10 uses CCD cameras including a charge coupled device (CCD) or the like, and comprises a pair of CCD cameras 11a and 11b on right and left sides for a short distance and a pair of CCD cameras 12a and 12b on right and left sides for a long distance. The stereoscopic optical system 10 is connected with the image processor 20 for realizing a function as the stereoscopic picture processing means 15.

Furthermore, the image processor 20 is connected with a distance picture processing computer 120 for realizing a function as the construction detection means 100 and the gap distance calculation means 110. The distance picture processing computer 120 is also connected with a display 3 as the information means 115.

The image processor 20 comprises a distance detection circuit 20a and a distance picture memory 20b. The distance detection circuit 20a searches portions imaging the same object in each fine regions against the pair of two stereoscopic pictures imaged by the stereoscopic optical system 10, and calculates a distance to the object in dependency on a discrepancy amount of positions corresponding to the portions searched. The distance picture memory 20b stores distance data which is an output of the distance detection circuit 20a.

The distance picture processing computer 120 comprises a multi-microprocessor system constitution in which a microprocessor 120a, microprocessor 120b and a microprocessor 120c are interconnected one another through a system bus 121. The microprocessor 120a mainly performs a processing of detecting respective object, the microprocessor 120b mainly performs a processing of detecting a side wall, and the microprocessor 120c mainly performs a processing of calculating a gap distance.

The system bus 121 is connected with an interface circuit 122 connected to the distance picture memory 20b, a read only memory (ROM) 123 storing a control program, a random access memory (RAM) 124 storing various parameters during calculation processing, an output memory 125 for storing parameters as processed results, a display controller (DISP. CONT.) 126 for controlling the display (DISP.) 3, and an interface circuit 127 for inputting signals from sensors and switches such as a vehicle speed sensor 4, a steering angle sensor 5 for detecting a steering angle, and a mode setting switch 6 for selecting a supporting mode of the ADA for the driver, which are mounted on the vehicle.

The distance picture processing computer 120 has divided memory regions respectively used by the microprocessors 120a, 120b and 120c, and parallel executes a object detection processing and side wall detection processing in dependency on the distance data from the image processor 20. The computer 120 displays a picture on the display 3 after a gap distance calculation processing in dependency on the detected object data when a standard signal inputs by a manipulation of the mode setting switch 6 by the driver.

Figure 3:
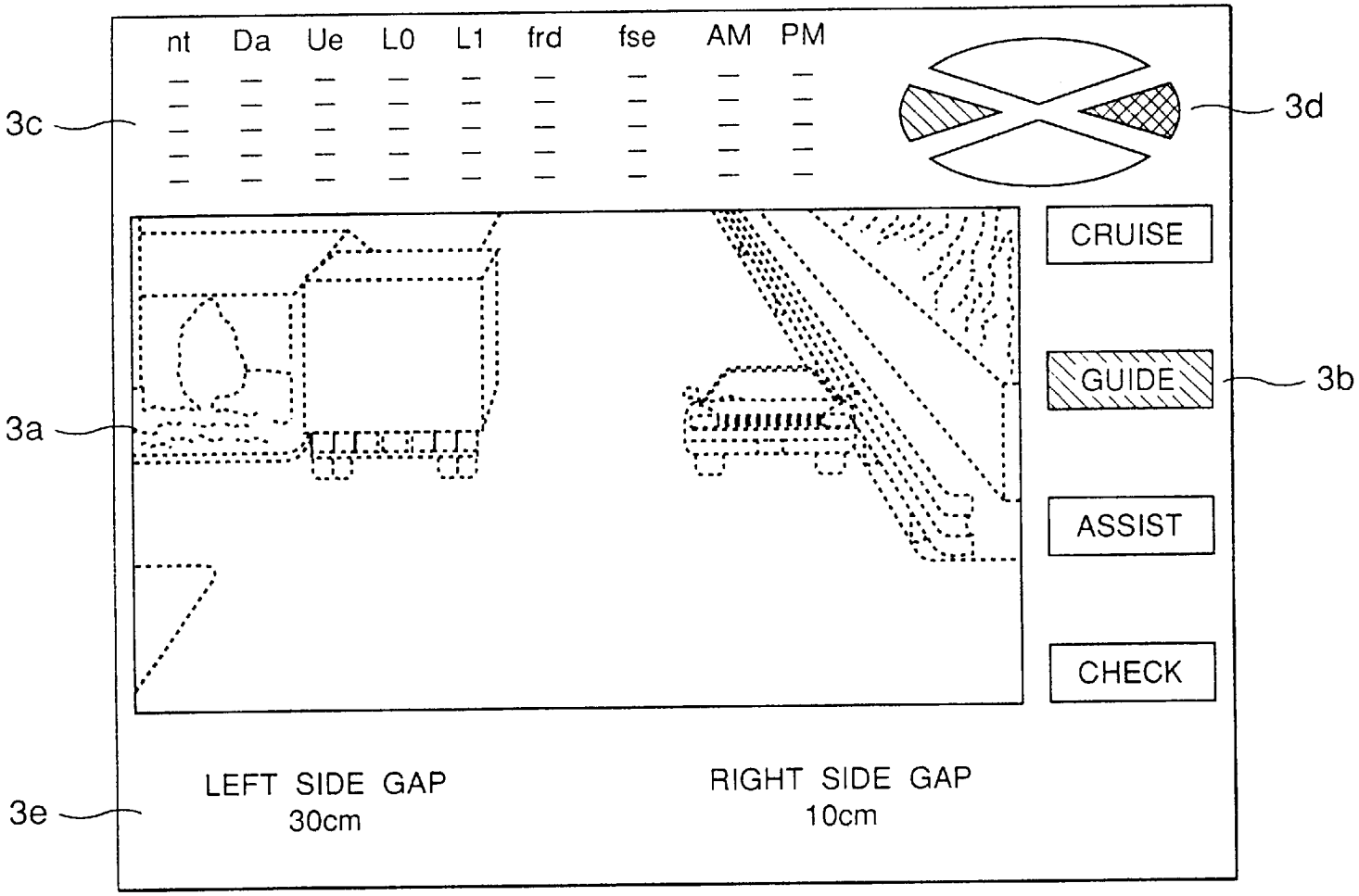
FIG. 3 is an explanatory view showing a screen of a display.

As shown in FIG. 3, a monitor portion 3a is provided at the central portion in a screen of the display 3 in order to display a prospect (scene) in front of the vehicle by a condition of the distance picture mentioned below. A mode display portion 3b is provided on the side of the monitor portion 3a in order to display each mode (cruise, guide, assist and check) of the ADA, thereby lighting a relevant display of the monitor portion 3a corresponding to an operation input of the mode setting switch 6.

Furthermore, a data display portion 3c and a position display portion 3d displaying front, rear, right and left of the vehicle by the quadrisected oval shape are provided over the monitor portion 3a, and a mode data display portion 3e is provided under the monitor portion 3a in order to display characters of the distance between vehicles, speed, left gap distance and right gap distance with numerical values of a calculation.

In this invention, the driver selects the guide mode by operating the mode setting switch 6 when the vehicle should pass through the narrow path where a plurality of various obstacles exist. As a result, the display portion of "guide" in the mode display portion 3b is turned on, and at the same time the computer 120 calculates each distance on right and left sides between extending lines of the right and left sides of the body and ends of the obstacles around the vehicle on the road in dependency on the distance picture after processing a pair of the stereoscopic pictures imaged by the stereoscopic optical system 10.

As shown in FIG. 3, the numerical value of the gap distance is displayed under the characters of the right and left gap distances in the mode data display portion 3e, and the right and left portions of the position display portion 3d are turned on. The position display portion 3d is turned of and displayed by red on the corresponding side to alarm to contact wit the obstacle if going straight when the calculated gap distance is on or less than 0(zero). The position display portion 3d is turned on and displayed by yellow because of the danger to contact by carelessly handling the wheel by the driver when the gap distance is more than 0(zero) and on or less than 20 cm. The position display portion 3d is turned on and displayed by green to represent that the danger is sufficiently small if going straight when the gap distance is more than 20 cm.

Accordingly, the driver can make sure on the screen of the on the display that the vehicle safely passes through the narrow path by manipulating the mode setting switch 6 before passing through the narrow path where the side wall, the electric (telephone) pole and the parking car exist, thereby previously avoiding a contact accident by decreasing a burden of the driver. Furthermore, since the driver can grasp the gap distance quantitatively, it is possible for the driver to easily learn the vehicle position and to plan an advancement of a safe driving.

As a simplified construction, an indicator such as a bar graph may be provided in place of the display 3 for charging a light portion corresponding to the gap distance. Furthermore, a tone and a voice may be adopted as the information means 115 for informing the gap distance data to the driver, in place of the visual display.

There will be described an image processing function by the image processor 20, a construction detection function by the distance picture processing computer 120, and a gap distance calculation function when the guide mode is selected by the mode setting switch 6. The gap distance calculation by the picture processing computer 120 is executed only when the detected constructions do not block the way to the advancing direction as an obstacle.

Figure 4:
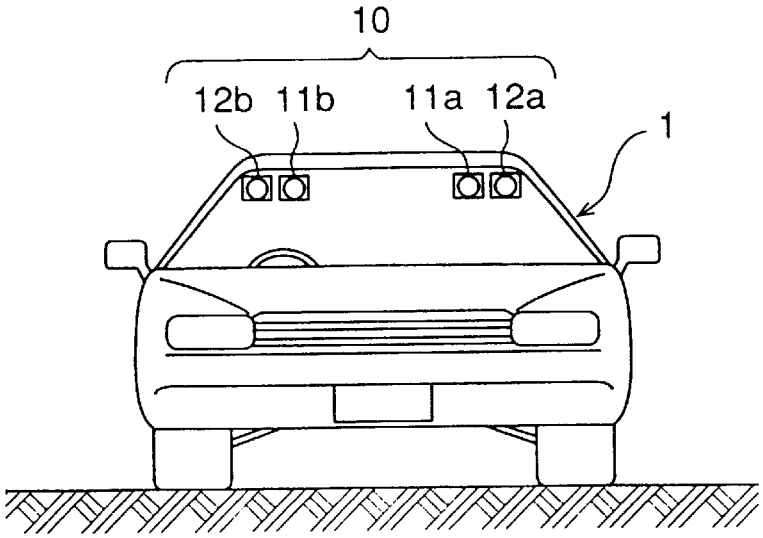
FIG. 4 is a front view showing a vehicle.

A pair of cameras in the right and left sides constituting the stereoscopic optical system 10, as shown in FIG. 4, comprise two CCD cameras 11a and 11b (denoted by a CCD camera 11 as representation) and two CCD cameras 12a and 12b (denoted by a CCD camera 12 as representation). The CCD cameras 11a and 11b are arranged at the front portion on the ceiling in the room with a predetermined distance for imaging an obstacle in a short distance, and the CCD cameras 12a and 12b are also arranged at outer portions with each distance from the CCD cameras 11a and 11b for imaging an obstacle in a long distance, respectively.

In order to measure a distance from the nearest position to a position within 100 meters by the stereoscopic optical system 10, it is sufficient to measure positions from 2 to 100 meters front when the CCD cameras 11 and 12 in the room are 2 meters from a front end of the hood.

Accordingly, if the short distance CCD cameras 11a and 11b measure the positions within 2–20 meters and the long distance CCD cameras 12a and 12b measure positions within 10–100 meters, the cameras 11 and 12 can measure entire range with a security of the reliability by keeping a overlapped area in 10–20 meters front.

The distance calculation method by the image processor 20 will be described below with respect to the short distance CCD camera 11 as an example. The distance calculation with the long distance CCD camera 12 is the same processing as the camera 11. In the running guide device 2 according to the present embodiment, the short distance CCD camera 11 is used to detect construction just in front of the vehicle.

Figure 5:
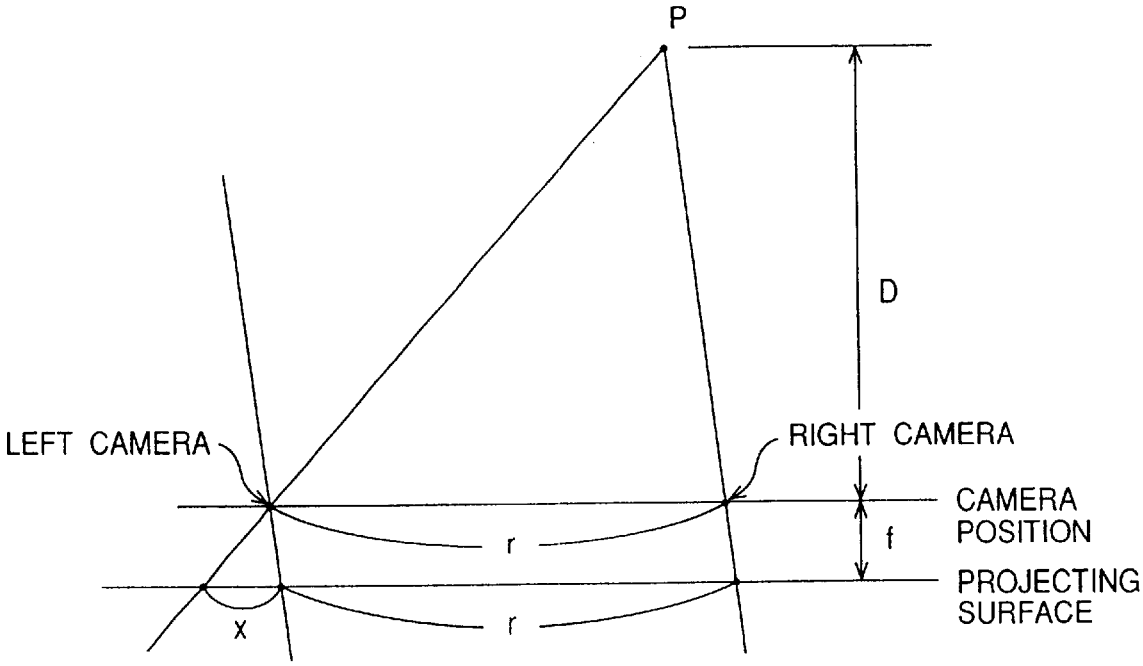
FIG. 5 is an explanatory view showing a relationship between a camera and an object.

Accordingly, an image of a point P is taken on a projection plane of f distant from focal points of respective cameras, in which the point P is distant from set surfaces of two cameras 11a and 11b with a distance D, an arranged distance is r between two short distance cameras 11a and 11b, as shown in FIG. 5, and each of focal points is f of two cameras 11a and 11b.

At this time, if a discrepancy amount is x, "r+x" is obtained as the distance between the position of the image on the right CCD camera 11b and the position of the image on the left CCD camera 11a, and the distance D to the point P can be obtained by the following equation (1) from the discrepancy amount x:

$$D=r\cdot f/x \tag{1}$$

The discrepancy amount x between the right and left pictures can be also detected after discover of the coincidence portion of the features such as edges, lines and specific shapes. However, in order to avoid a deterioration of the data amount, respective distance distribution in each small region is obtained with the entire screen by the image processor 20, in which the picture is divided into a plurality of small regions when finding the same object in the right and left pictures, and corresponding small regions in the right and left pictures are found out by comparing a pattern of luminance and color within the small regions.

An estimation of the coincidence of the right and left pictures, namely a stereoscopic matching, can be performed by a city block distance H represented by the following equation (2), for example, when the luminance (color can be used) in the i-th pixel in the right and left pictures are respectively Ai and Bi:

$$H=\Sigma|Ai-Bi| \quad (2)$$

The stereoscopic matching by the city block distance H has no deterioration of the data amount caused by the subtraction of a mean value, and can improve a calculation speed because of no multiplication. However, the matching method has a problem that the detected distance is uncertain because it is possible to grasp objects of longer distance and shorter distance in the same region when the size of the small region to be divided is too big. Accordingly, even though it is desired that the region is small to obtain the distance distribution of the picture, the data amount is insufficient to investigate the coincidence when the small region is too small. Therefore, when the apparatus of the present invention obtains an image with respect to the vehicle which is away 100 meters from the vehicle thereof in the manner of not including in the same region of a vehicle running in the adjacent lane, the obtained small regions are four pixels against the stereoscopic optical system 10 if the four pixels are the maximum value in the width direction. As the result that the optimum pixel number is obtained in the actual picture in dependency on the maximum value, respective four pixels can be obtained in dimensions.

In the following description, the image is divided into small regions of 4×4 to investigate the coincidence between the right and left pictures, and the stereoscopic optical system 10 is represented by the CCD cameras 11a and 11b.

Figure 6:
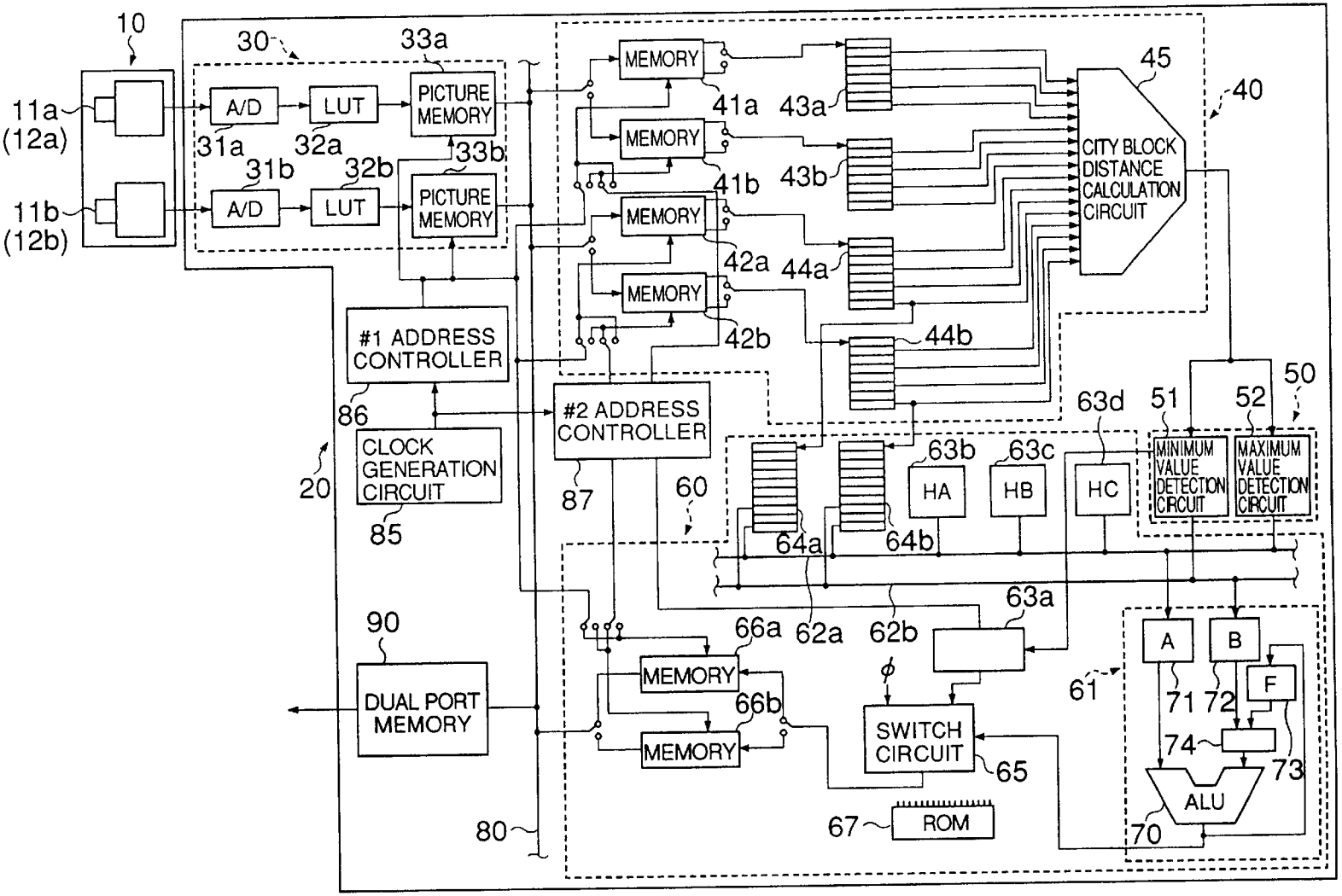
FIG. 6 is a detailed circuit diagram showing an image processor.

A detailed circuit diagram of the image processor 20 is shown in FIG. 6. The circuit of the image processor 20 comprises the distance detection circuit 20a and the distance picture memory 20b. The distance detection circuit 20a comprises an picture converter 30 for converting an analog picture imaged by the stereoscopic optical system 10 into a digital picture, a city block distance calculator 40 for continuously calculating the city block distance H for determining the discrepancy amount x between the right and left pictures by means of shifting pixels one by one, a minimum and maximum values detector 50 for detecting the minimum value $H_{MIN}$ and maximum value $H_{MAX}$ of the city block distance H, and a discrepancy amount determiner 60 for determining the discrepancy amount x by checking whether the minimum value obtained by the minimum and maximum values detector 50 represents the coincidence between the right and left small regions or not. The distance picture memory 20b adopts a dual port memory 90.

The picture converter 30 comprises analog/digital (A/D) converter 31a and 31b respectively corresponding to the CCD cameras 11a and 11b for right and left pictures, and which are respectively connected with look up tables 32a and 32b as a data table, and picture memories 33a and 33b for each storing pictures respectively imaged by the CCD cameras 11a and 11b. Since the city block distance calculator 40, as mentioned later, repeatedly take out and process a part of the picture, the picture memories 33a and 33b can comprise a comparatively low speed memory, thereby decreasing a manufacturing cost.

Each of the A/D converters 31a and 31b has a resolving power of 8 bits, for example, and converts the analog picture from the right and left CCD cameras 11a and 11b into the digital picture having a predetermined luminance gradation. In other words, the converter converts the analog picture into a gray scale of 256 gradations, for example, because data are immediately lost for calculating the coincidence between the right and left pictures when a binary processing of the picture is performed for a high speed processing.

Furthermore, each of LUTs 32a and 32b is formed on the ROM to increase a contrast of a low luminance portion in the picture converted in the digital amount by the A/D converters 31a and 31b and to compensate the difference of characters between the right and left CCD cameras 11a and 11b. The signal converted by the LUTs 31a and 31b is once stored in the picture memories 33a and 33b, respectively.

In the city block distance calculator 40, a pair of input buffer memories 41a and 41b are connected through a common bus 80 to the picture memory 33a for the left picture in the picture converter 30, and a pair of input buffer memories 42a and 42b are connected through the common bus 80 to the picture memory 33b for the right picture.

A pair of the input buffer memories 41a and 41b for the left picture are connected to a pair of shift registers 43a and 43b each having a eight steps constitution, and a per of the input buffer memories 42a and 42b for the right picture are connected to a pair of shift registers 44a and 44b each having an eight step constitution. Two pairs of the shift registers 43a, 43b, 44a and 44b are connected with a city block distance calculation circuit 45 for calculating a city block distance.

Furthermore, the shift registers 44a and 44b for the right picture are a pair of shift registers 64a and 64b each having a ten step constitution and arranged in a discrepancy amount determiner 60 mentioned later. Old data after a calculation of the city block distance H are transferred to the shift registers 64a and 64b to be used for determining the discrepancy amount x when the data transfer starts with respect to the next small region.

Figure 7:
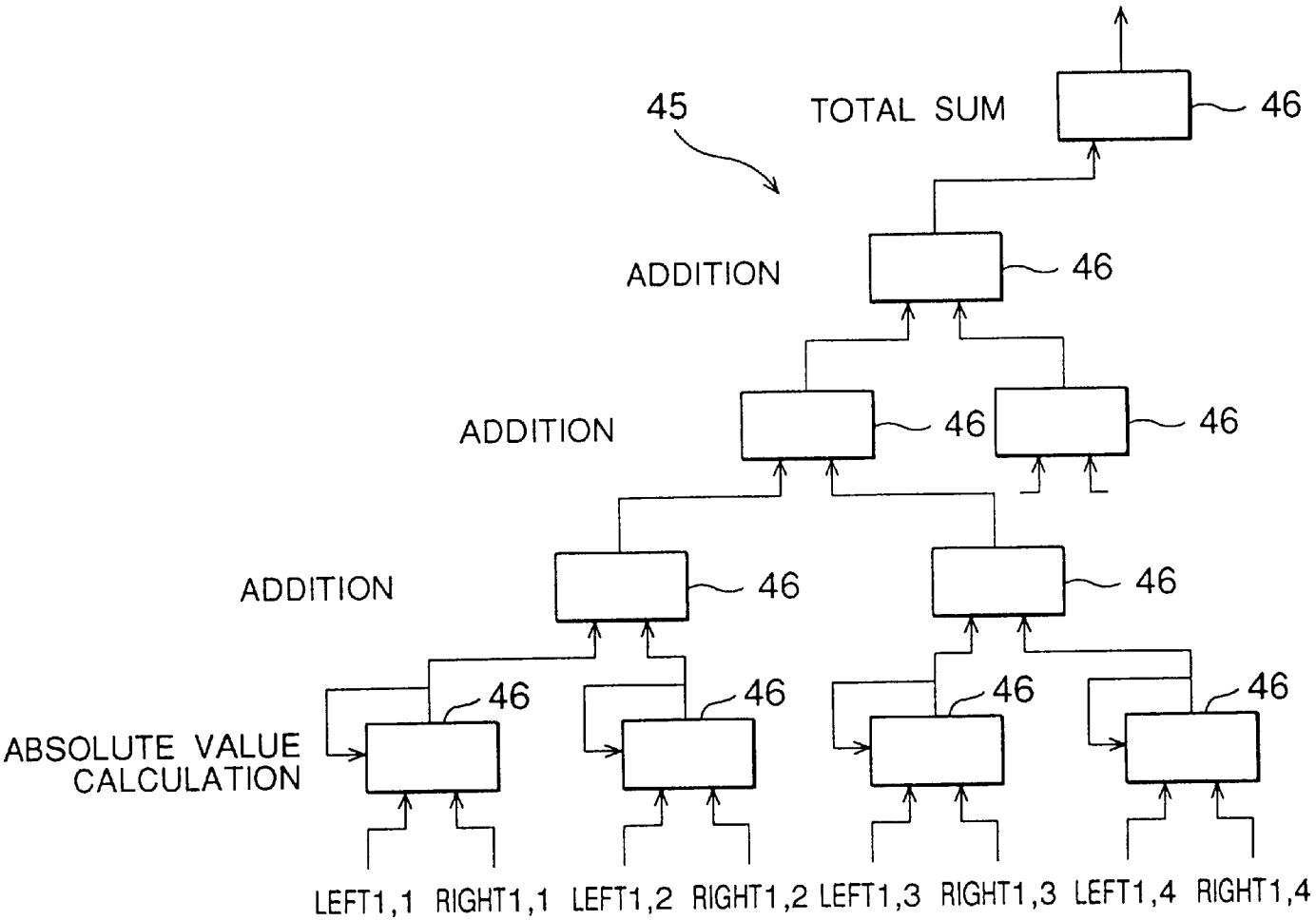
FIG. 7 is an explanatory view showing a city block distance calculation circuit.

The city block distance calculation circuit 45 is coupled with a high speed CMOS calculator 46 in which adders, subtracters and coupled input/output latches are formed in one chip, and instantaneously inputs and calculates the eight pixel components, for example, by a pipe line structure in which sixteen calculators 46 are connected with one another in a pyramid shape, as shown in FIG. 7. The pyramid structure has a first stage as an absolute value calculator, two through four stages as first, second and third adders, and a final stage as a total sum adder. FIG. 7 shows only a half structure of the absolute value calculator and the adders at first and second stages.

The input buffer memories 41a, 41b, 42a and 42b respectively have a comparatively small capacitance and a high speed type corresponding to a speed of the city block distance calculation, and each have a divided input and output for commonly receiving an address generated by a #1 address controller 86 according to a clock supplied from a clock generation circuit 85. A #2 address controller 87 controls a transfer of data between two pair of shift registers 43a, 43b, 44a and 44b.

The minimum and maximum values detector 50 comprises a minimum value detection circuit 51 for detecting a minimum value $H_{MIN}$ of the city block distance H and a maximum value detection circuit 52 for detecting a maximum value $H_{MAX}$ of the city block distance H, and has a constitution of two high speed CMOS calculators for respectively detecting the minimum and maximum values as the same as the city block distance calculation circuit 45 so as to maintain a synchronization with an output of the city block distance H.

Figure 8:
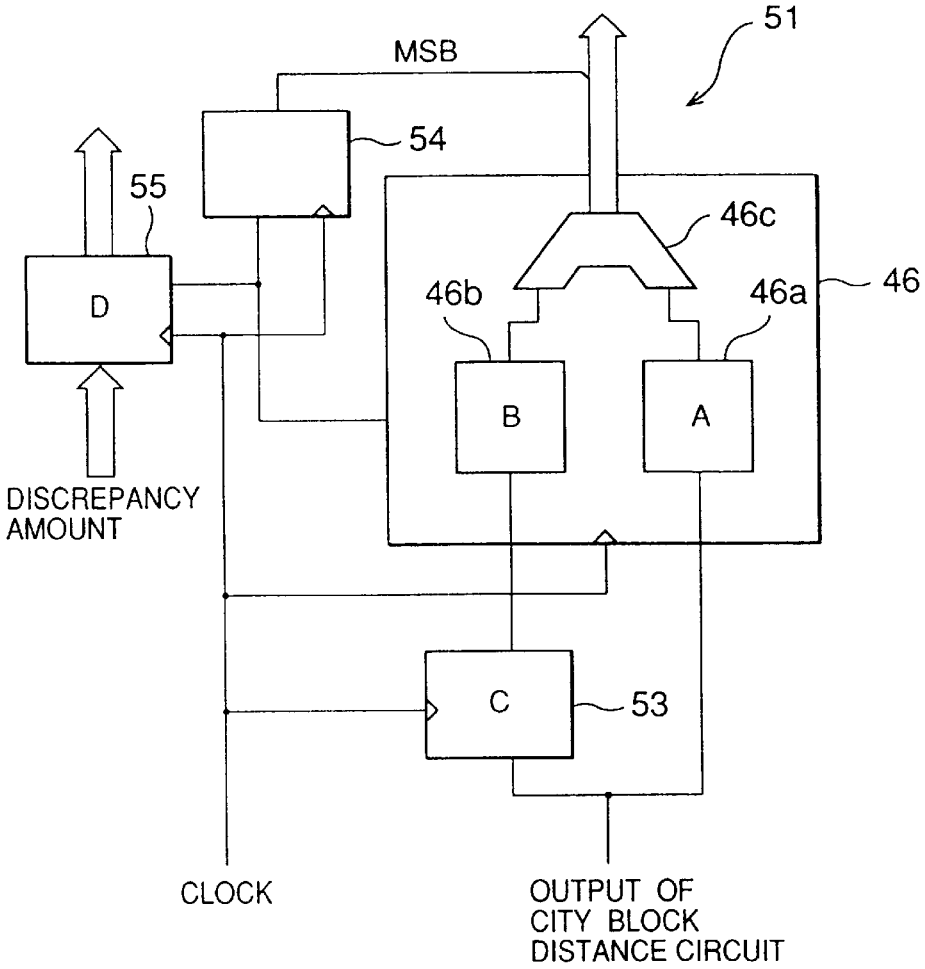
FIG. 8 is a block diagram showing a minimum value detection circuit.

As shown in FIG. 8, the minimum value detection circuit 51 comprises in detail a calculator 46 having an A register 46a, a B register 46b and an arithmetic logic unit (ALU) 46c, and a C latch 53, a latch 54 and a D latch which are connected with the calculator 46. An output of the city block distance calculation circuit 45 is supplied to the A register 46a and B register 46b through C latch 53 and the most significant bit (MSB) in the output of the ALU 46 is outputted to the latch 54. An output of the latch 54 is supplied to the B register 46b and D latch 55. The B register 46b stores an intermediate value of the minimum value calculation in the calculator 46. The D latch 55 stores the discrepancy amount δ in the minimum value calculation. The maximum value detection circuit 52 has the same constitution as the minimum value detection circuit 51 except an opposite logic and non-storage of the discrepancy amount δ.

As previously described, the city block distance H is calculated step by step with shifting pixels one by one of the left picture small region against one right picture small region. Accordingly, the maximum and minimum values HMAX and $H_{MIN}$ of the city block distance H in the small region can be obtained by a comparison and renewal of the previous maximum and minimum values $H_{MAX}$ and $H_{MIN}$ at each output of a value of the city block distance H, and at the same time, an output of the last city block distance H is obtained.

The discrepancy amount determiner 60 is constituted as a RISK processor having a comparatively small size. The determiner 60 comprises a calculator 61 as a main portion, 16 bit width data bus 62a and 62b, a latch 63a for holding the discrepancy amount x, a latch 63b for holding a threshold value $H_A$ as the first reference value, a latch 63c for holding a threshold value $H_B$ as a second reference value, a latch 63d for holding a threshold value $H_C$ as a third reference value, a switch circuit 65 for outputting the discrepancy amount x or an output of "0" after receiving an output of the calculator 61, output buffer memories 66a and 66b for temporarily storing an output of the switch circuit 65, and a ROM 67 of the sixteen bits width for storing a control program about an operation timing of the circuit and a function of the calculator 61.

The calculator 61 comprises an ALU 70 as a main portion, an A register 71, a B register 72, an F register 73 and a selector 74. The A register 71 is connected with the data bus 62a (called hereafter as an A bus 62a), and the. B register 72 is connected with the data bus 62b (called hereafter as an B bus 62b), thereby activating the switch 65 in dependency on the calculated result of the ALU 70, and storing the discrepancy amount x or the output "0" in the output buffer memories 66a and 66b.

The A bus 62a is connected with the maximum value detection circuit 52, the latches 63b, 63c and 63d holding each of the threshold value $H_A$, $H_B$ and $H_C$, and the B bus 62b is connected with the minimum value detection circuit 51. The A bus 62a and the B bus 62b are connected with the shift registers 64a and 64b, respectively.

The switch circuit 65 is connected with the calculator 61 and the minimum value detection circuit 51 through the latch 63a. The calculator 61 determines three checking conditions mentioned later to output a determined result to change the outputs to the output buffer memories 66a and 66b.

The discrepancy amount determiner 60 checks whether the obtained minimum value $H_{MIN}$ of the city block distance really represents the coincidence between the right and left small regions or not. The determiner 60 outputs the discrepancy amount x of the pixels corresponding to the buffer memories 66a and 66b only when the condition is satisfied.

Accordingly, the discrepancy amount is the discrepancy amount x to be obtained when the city block distance H is the minimum value $H_{MIN}$. The discrepancy amount x is outputted when three checking conditions below are satisfied, and the "0" is outputted without adopting the data when the conditions are not satisfied:

(1) $H_{MIN} \leqq H_A$ (The distance can not be obtained when $H_{MIN} > H_A$.)

(2) $H_{MAX} - H_{MIN} \geqq H_B$ (this is a condition for checking that the obtained minimum value $H_{MIN}$ clearly becomes low by flickering of noises, and the checking object is the difference between the minimum value $H_{MIN}$ and the maximum value $H_{MAX}$ without the difference between the minimum value $H_{MIN}$ and the nearest value thereof, thereby detecting the distance against an object such as a curved surface and the like slowly changing a luminance.)

(3) the luminance difference between adjacent pixels in the horizontal direction in the small region of the right picture>$H_C$ (even though the detection becomes an edge detection when the threshold value $H_C$ becomes large, the threshold value $H_C$ is set to be lower than the usual edge detection level because it is possible to correspond to the case where the luminance slowly changes. The condition is based on the fundamental principle in which the distance can not be detected in a portion without the luminance change. Since the detection in the portion is performed with each pixel in the small region, there is adopted only pixel of which the actual distance is detected in the small region, thereby obtaining a natural result.)

The distance distribution data, which are as the final result outputted from the discrepancy amount determiner 60, are written in a dual port memory 90 as a distance picture memory 20b through a common bus 80.

Figure 9:
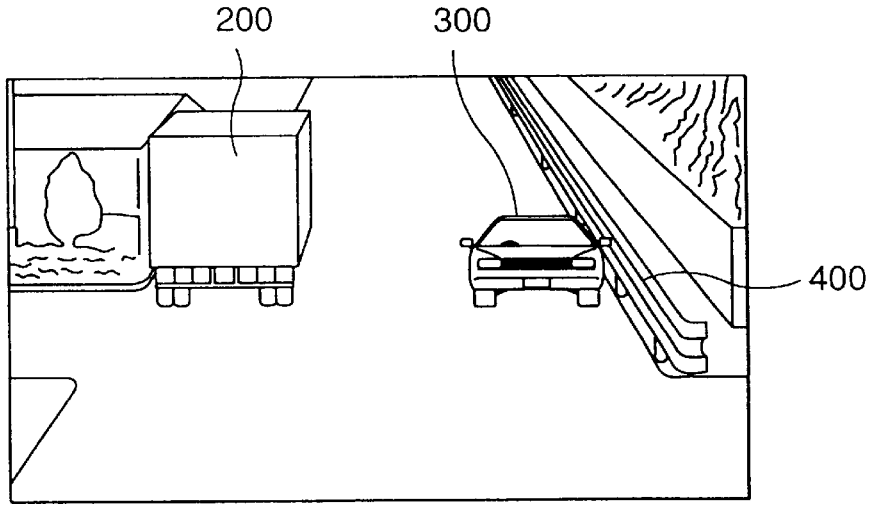
FIG. 9 is an explanatory view showing an example of a picture imaged by a CCD camera mounted on the vehicle.

The distance distribution data from the image processor 20 have such a form as the picture (a distance picture), for example, the picture imaged by the CCD camera 11 as shown in FIG. 9. The picture for imaging the constitution such as parking cars 200 and 300 and guardrail 400 (showing the picture imaged by the one camera in FIG. 9) is processed by the image processor 20 to generate the image shown in FIG. 10.

Figure 10:
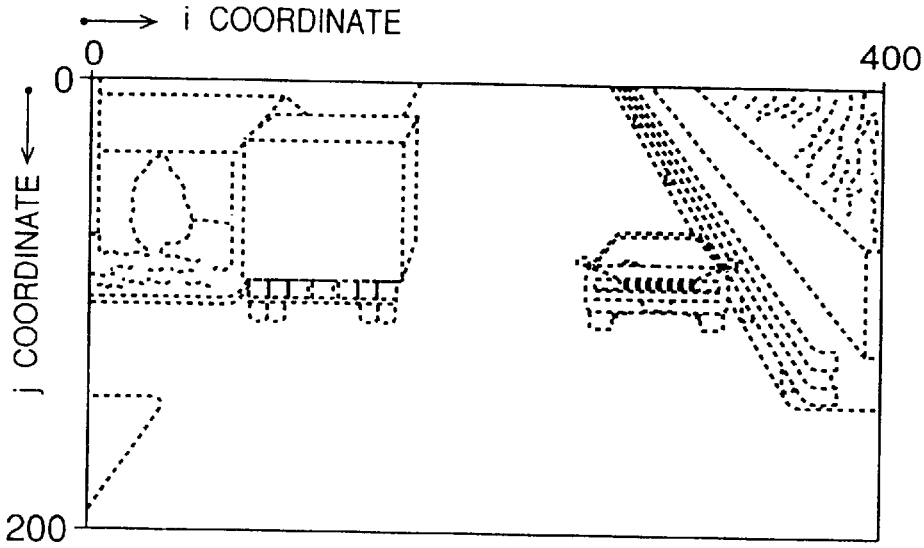
FIG. 10 is an explanatory view showing an example of a distance picture.

In an example of the distance picture shown in FIG. 10, the picture has a size 400 by 200 pixels in dimensions, distance data are in a black portion in which a brightness change between two adjacent pixels in right and left direction is larger within respective pixels in the picture shown in FIG. 9. The coordinate axes on the picture is that the horizontal direction is an i coordinate axis at an original point in upper left corner, a vertical direction is a j coordinate axis, and a unit is pixels, as shown in FIG. 10.

The distance picture is read in the distance picture processing computer 120 to detect a plurality of objects such as other cars and obstacles existing in front of the vehicle, so as to calculate a position and size of the objects, thereby extracting an outline image of the detected objects. Furthermore, it is possible to calculate a correlative speed thereof caused by a time lag of the position.

In this case, the distance picture processing computer 120 uses a three dimensional data of the object, and performs a distinction of the road and background in dependency on the height from the road surface and a distinction of the object and background in dependency on a distance value. Therefore, the distance picture processing computer 120 first changes the coordinate axes of the distance picture from the image processor 20 to the coordinate axes of the actual space around the vehicle 1, and calculates the position and size corresponding to the detected construction.

Figure 11:
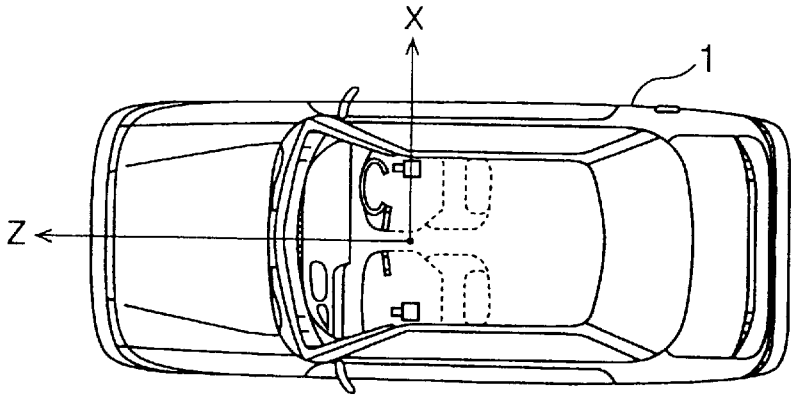
FIG. 11 is a plan view of the vehicle.
Figure 12:
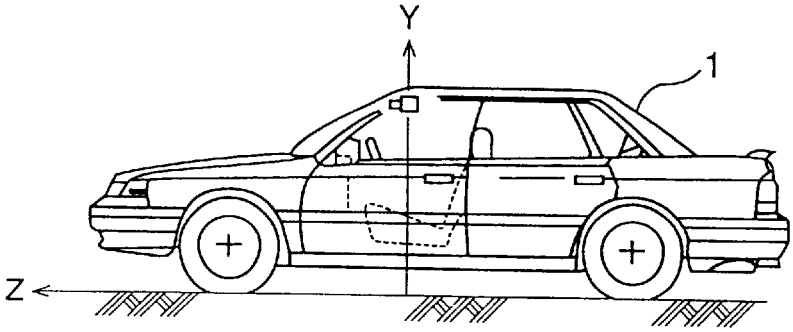
FIG. 12 is a side view of the vehicle.

Accordingly, as shown in FIGS. 11 and 12, when the coordinate axes of the actual space is fixed to the coordinate axes of the vehicle 1, in which an X axis is a right side of the vehicle 1, a Y axis is over the vehicle 1, a Z axis is in front of the vehicle 1, an original point is a road surface at the center and immediately under two CCD cameras 11a (12a) and 11b (12b), an X-Z plane (Y=0) coincides with the road surface in the case that the road is flat, and the three dimensional position of the object can be obtained in accordance with the following equations (3) and (4) in dependency on the distance data (i, j, Z) in the picture by a kind of the coordinate conversion:

$$Y=CH-Z\times PW\times(j-JV) \quad (3)$$

$$X=r/2+Z\times PW\times(i-IV) \quad (4)$$

where,

CH: an attached height of the CCD camera 11 (12),

PW: a visual angle per one pixel,

JV, IV: a coordinate on the picture of an infinite far point in the direct front of the vehicle 1.

Furthermore, the equations (3) and (4) can be changed to the following equations (5) and (6) in order to calculate the position (i, j) on the picture in dependency on the three dimensional axes (X, Y, Z) of the actual space:

$$j=(CH-Y)/(Z\times PW)+JV \quad (5)$$

$$i=(X-r/2)/(Z\times PW)+IV \quad (6)$$

If the attached position of the CCD camera 11 is shown in the XYZ coordinate axes of the actual space, the right CCD camera 11b is X=0.20 (m), Y=1.24 (m), and Z=0.0 (m), and the left CCD camera is X=−0.20 (m), Y=1.24 (m), and Z=0.0 (m), for example.

Figure 13:
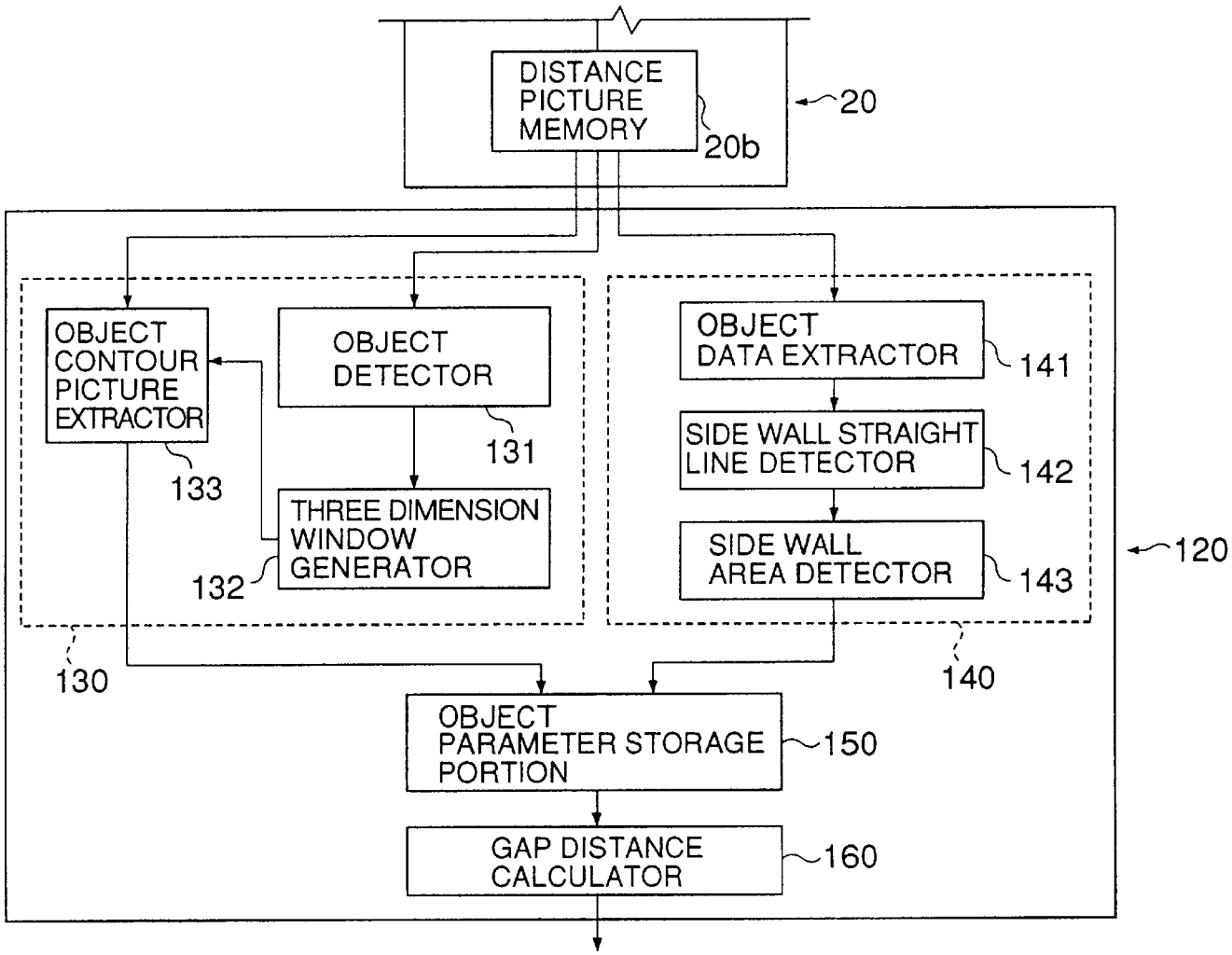
FIG. 13 is a function block diagram of a distance picture processing computer.

FIG. 13 shows a functional constitution of the distance picture processing computer 120 mainly comprising an object recognizer 130 for the microprocessor 120a, a side wall detector 140 for the microprocessor 120b, a gap distance calculator 160 for the microprocessor 120c. A processed result of the object recognizer 130 and side wall detector 140 is stored in a construction parameter storage portion 150 comprised of an output memory 125, and is read in other device (not shown) for the microprocessor 120c (the gap distance calculator 160) and ADA.

Furthermore, a function of the object recognizer 130 is divided into an object detector 131, a three dimensional window generator 132, and an object contour extractor 133. The object recognizer 131 divides the distance picture from the image processor 20 into a predetermined interval (for example, 8–20 pixel intervals) in the stripe shape, selects only constitution data having the danger as an obstacle for running, and calculates the detected distance.

Figure 14:
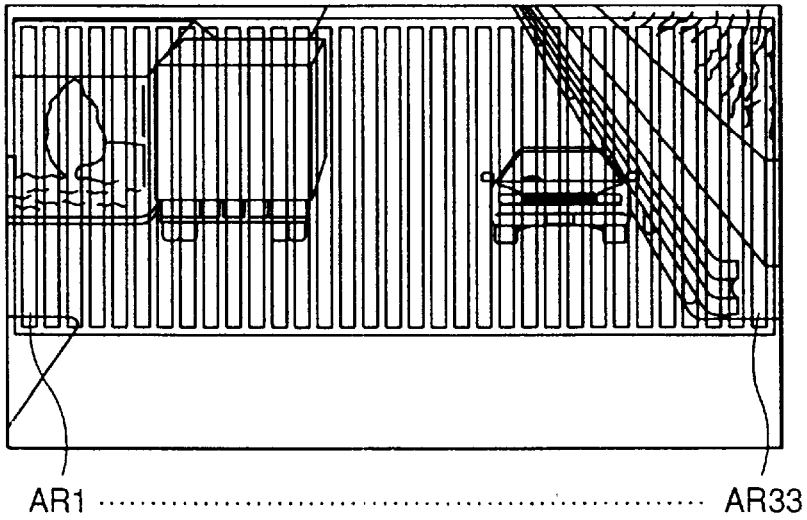
FIG. 14 is an explanatory view showing a classification method of a picture.

FIG. 14 is an explanatory view for setting a stripe shape region of the bright picture imaged the front view from the vehicle 1. The distance picture shown in FIG. 10 is actually divided as shown in FIG. 14. In the embodiment, the picture is divided into thirty three small regions $AR_1$–$AR_{33}$ with twelve pixel intervals. Accordingly, since the object is searched by dividing the picture into a plurality of regions, it is possible to instantaneously detect a plurality of objects.

In the object in each region, the three dimensional position (X, Y, Z) of the actual space is calculated from the coordinate (i, j) on the picture and the distance data Z by using the above-mentioned equations (3) and (4), and the height H of the object at the distance Z from the road surface can be calculated by the following equation (7) when the height of the road surface is Yr:

$$H=Y-YR \quad (7)$$

Since the coordinate axes are set as shown in FIGS. 11 and 12, Yr can be set to Yr=0.0 (m) unless there are the specific inclination and a vertical shock on the vehicle 1. Since an object of the height H under 0.1 (m) such as a white line, stain or shadow on the road does not obstruct the vehicle running on the road, the data thereof is deserted. An object over the height of the vehicle is supposed to be a pedestrian overpass and a road sign, which is deserted, and the apparatus selects only data of the construction to be obstacles on the road. Therefore, if the object overlaps on the road on the two dimensional picture, the apparatus can detect after distinguishing data in accordance with the height over the road surface.

Figure 15:
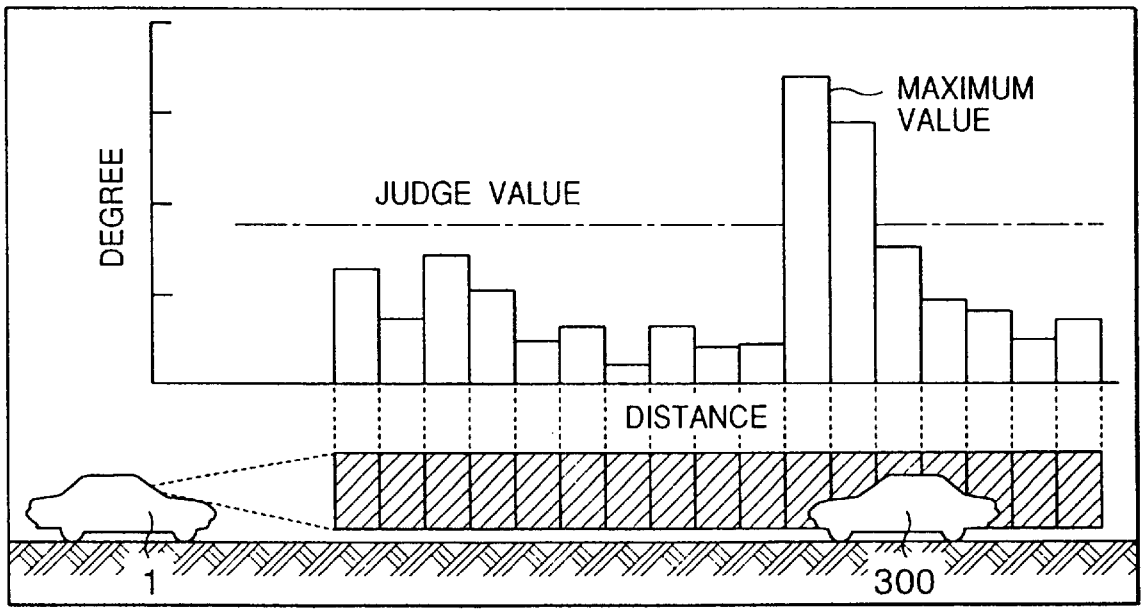
FIG. 15 is an explanatory view showing a relationship between a detected object and a histogram.

Next, with respect to the construction data extracted along the above-mentioned way, the apparatus counts a number of the data included predetermined section of the distance Z and makes a histogram using the distance Z as a horizontal axis. FIG. 15 is a histogram of the parking car 300 as the detected object in the right side in front of the vehicle in the picture example, and a number and length of the section of the distance Z are determined under the consideration of the detection limit and the precision of the distance Z and the shape of the construction as a detected object.

In the histogram, since an erroneously detected value exists in the distance data in the input distance picture, few data appear at a position in which an object does not exist actually. However, in the case where an object having a predetermined size exists, a frequency of the position shows a large value. On the other hand, in the case where no object exists, a frequency generated by the erroneous distance data becomes a small value.

Accordingly, if there is a section where a frequency of the generated histogram is more than the predetermined judge value and becomes the maximum value, the object exists in the judged section. To the contrary, when the maximum value of the frequency is less than the judge value, the object does not exist in the section. By this, even when the few noises are included in the picture data, a noise influence becomes within the minimum limit to detect the object.

When the object is judged to exist, a mean value of the distance data Z of the construction included in the detected section and sections before and after the detected section is calculated to treat as a distance to the object. After a distance detection ti the object is processed in entire regions, the apparatus investigates the detected distance of the object in each region, and judges that the object is the same when the difference of the detection distance to the object in the adjacent regions is less than the set value. To the contrary, when the difference is over the set value, the apparatus judges that the objects are different from each other.

In detail, a left end region $AR_1$ is investigated. When the object is detected, this is set to the object $S_1$ and to the distance $Z_1$. Next, an adjacent right region $AR_2$ is investigated. When the object is not detected, the object $S_1$ exists within and around the region $AR_1$ and the distance is judged to be $Z_1$ so as to detect the object. When the detected distance is $Z_2$, the difference between the distances $Z_1$ and $Z_2$ is investigated.

When the difference between the distances $Z_1$ and $Z_2$ is over the set value, the object detected in the region $AR_2$ is determined to be different from the previously detected object $S_1$, and to be new object $S_2$ and new distance $Z_2$. Then, the apparatus investigates further right adjacent region.

On the other hand, when the difference between the distances $Z_1$ and $Z_2$ is less than the set value, the object detected in the region $AR_2$ is judged as the object $S_1$ previously detected, and the distance is a mean value of $Z_1$ and $Z_2$. Then, further right regions will be investigated in the order, and the distance and existing regions are renewed when the object $S_1$ is judged to continuously exist.

It has been conventionally difficult to extract only the object data when a background distance around the object is imaged on the two dimensional picture. However, since the above-mentioned processing is performed from the region $AR_1$ of the left end to the region $AR_{33}$ of the right end to sort the data by the distance values, it is possible to detect by dividing a plurality of the object and the background with respect to the distance and exist regions, thereby detecting a plurality of the objects overlapped one another on the two dimensional picture by dividing them in dependency on the distances of each object.

The set value is desired to be 4–6 meters at detecting the vehicle and to be 1–2 meters at detecting the walkers in dependency on an experimental result.

Figure 16:
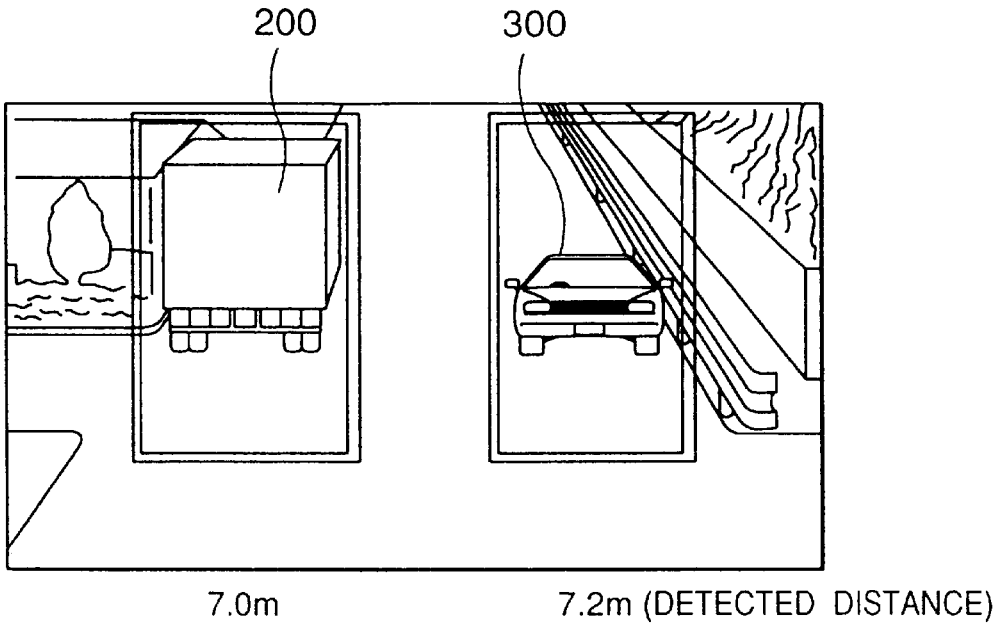
FIG. 16 is an explanatory view showing examples of a detected distance and a detected result of a region in which an object exists.

FIG. 16 shows by a block line an object existing region detected by the above processing. This embodiment detects two objects, namely, a vehicle 200 on the left side and a vehicle 300 on the right side. A numeral value shown at the bottom of the figure is a detection distance of each object.

Figure 17:
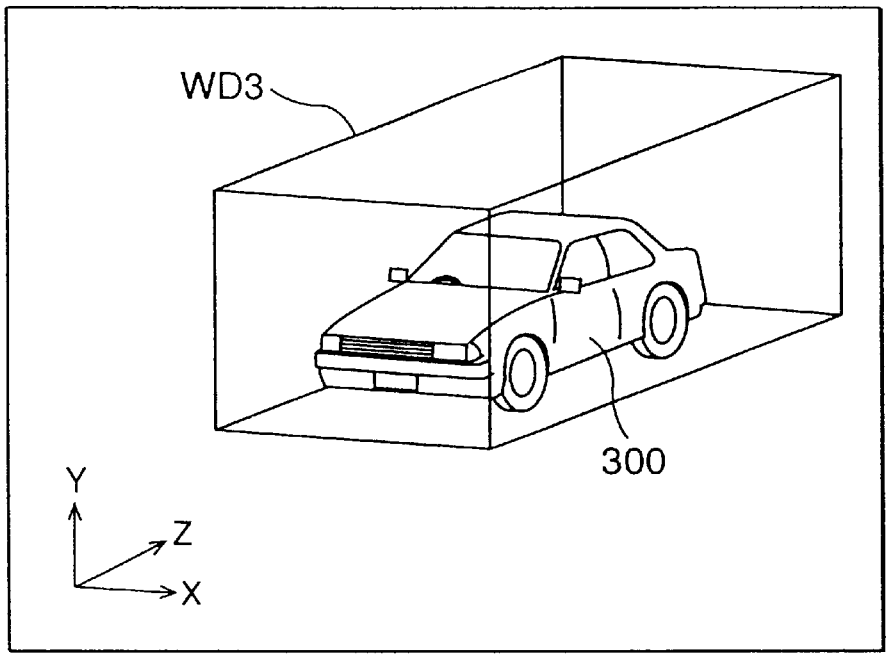
FIG. 17 is an explanatory view showing a shape of a three-dimensional window for detecting the object.

The three dimension window generator 132 sets a three dimensional space region of a rectangular solid shape, namely, a three dimension window $WD_3$ including the detected object (the parking car 300) in the three dimensional space shown in FIG. 17 with respect to each of the objects detected by the object detector 131, and calculates how to be shown the set three dimensional window $WD_3$ on the two dimensional picture, so as to set the detection object with respect to only data within a window contour line as the two dimension window $WD_2$.

The horizontal width of the three dimensional window $WD_3$ is within an area extending each one region of the right and left sides of the object existing regions. Because the other objects are not detected when the right and left ends of the objects overlap on any regions. In this case, the object to be detected is not detected because the object can not become large value on the histogram and the other object is detected. Accordingly, the window area should be extended to avoid such the condition.

The length in the distance Z direction of the three dimensional window $WD_3$ is within an area including the detected distance of the object and a section length of the histogram added with portions before and behind the detected distance. The lower end of the three dimensional window $WD_3$ resides in the position of adding 0.1 meter with the height of the road surface, and the upper end coincides with the upper ends of each of the divided regions for detecting the object.

Figure 18:
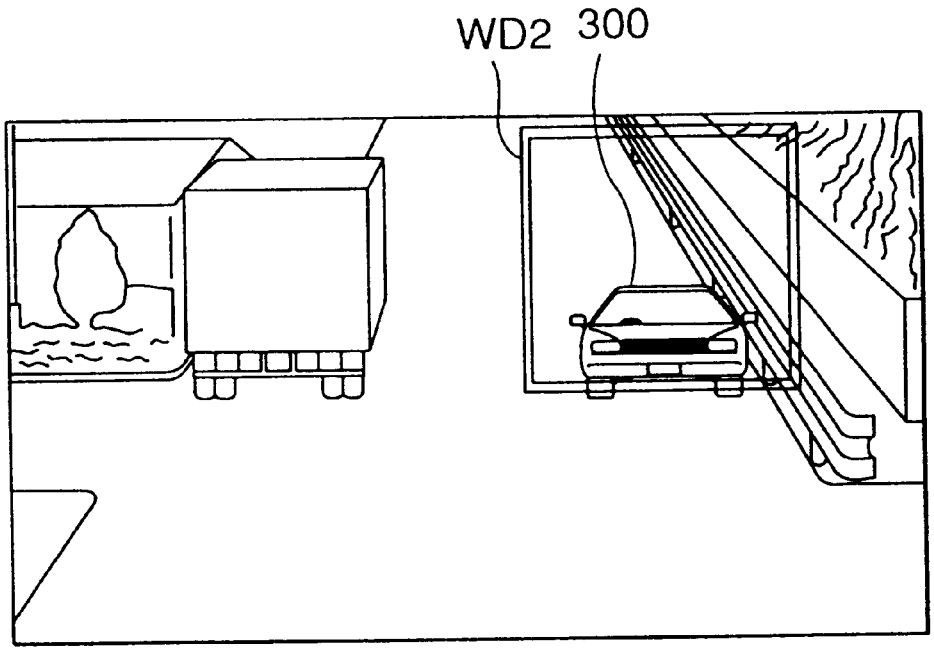
FIG. 18 is an explanatory view showing a shape of a two-dimensional window for detecting the object.

For the purpose of obtaining the two dimensional window $WD_2$ in dependency on the three dimensional window $WD_3$, the coordinate (in, jn) on the picture is first calculated by the above-mentioned equations (5) and (6) in dependency on each of the coordinate (Xn, Yn, Zn) of eight tops of the three dimensional window $WD_3$, and a polygon enveloping eight tops is calculated. FIG. 18 shows an example in which the two dimensional window $WD_2$ is set for one (the parked car 300) amongst the detected objects as has been shown in FIG. 16.

The object contour extractor 133 surveys one by one each of the data in the two dimensional window $WD_2$, selects only data included in the three dimensional window $WD_3$, extracts a contour image of the detected object, and detects a positional relationship between the detected object and vehicle own body.

Accordingly, the extractor 133 surveys one by one each of the data in the two dimensional window $WD_2$ for each object, calculates the three dimensional position (X, Y, Z) by the above mentioned equations (3) and (4) with respect to pixels having the distance data, extracts only data which values of the distance and height are included in a range of the three dimensional window $WD_3$, and deserts the other of data.

Figure 19:
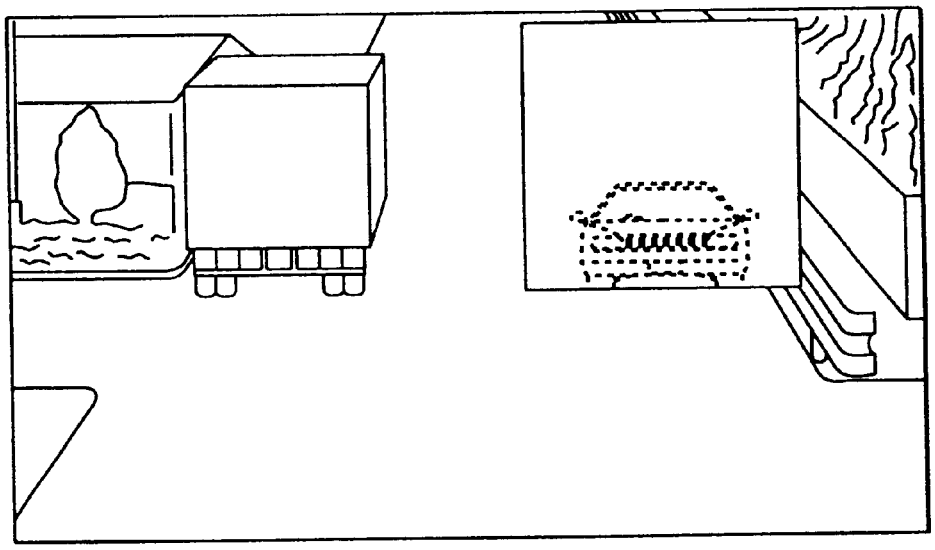
FIG. 19 is an explanatory view showing an example of data constituting a contour of the object.
Figure 20:
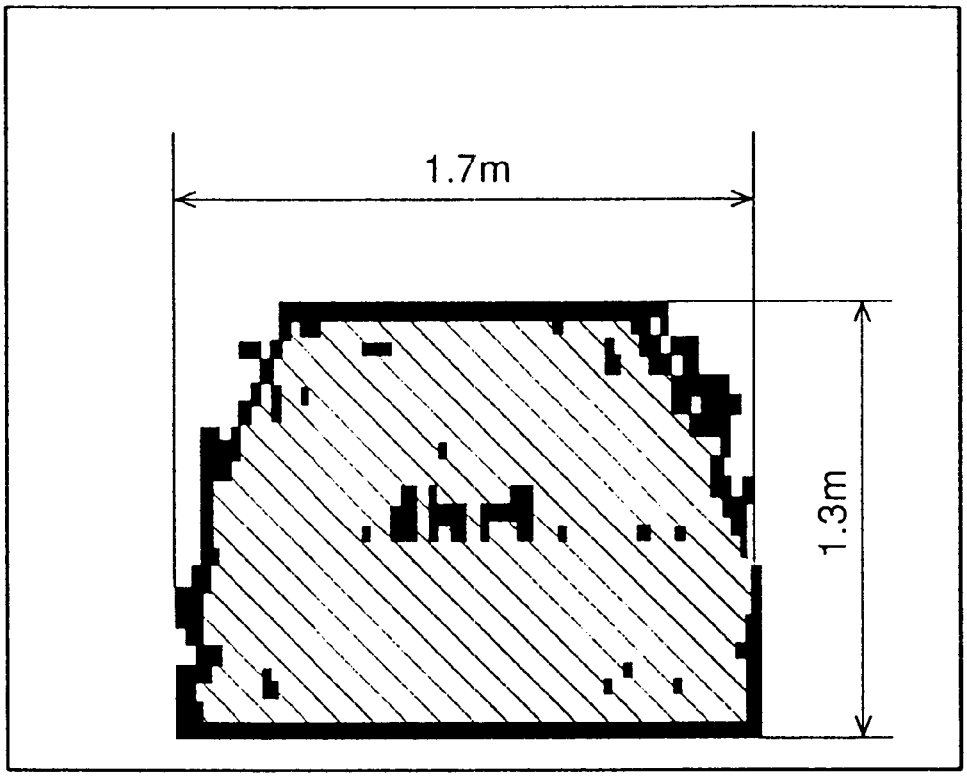
FIG. 20 is an explanatory view showing an example of an external form size detected as a contour picture.

FIG. 19 shows the extracted data in the manner of projecting them on the two dimensional picture. Furthermore, a contour picture of the object is obtained by a connection of an outline of the data by lines as shown in FIG. 20. A coordinate (i, j) on the pictures on the right and left ends and the upper end of the contour picture is detected to calculate positions of the right and let ends and upper end in the three dimensional space by using the detection distance Z of the object and the above-mentioned equation (3) and (4). As a result, the width of the object can be obtained by the positions of the right and left ends, and the height of the object can be obtained from the upper end position. In FIG. 20, it is possible to judge the object having a width of 1.7 meters and a height of 1.3 meters.

On the other hand, a function of the side wall detector 140 by the microprocessor 120b is further divided into a construction data extractor 141, a side wall straight line detector 142, and a side wall area detector 143, in which a distinction of the side wall from the road is performed by the height from the road surface, and the distinction of the side wall from the distant background is performed by the distance before and after the vehicle and the adjacent distance. Accordingly, the detector 140 extracts only data around the side wall presumed to exist, and the extracted side wall data are detected by the Hough transformation in view of the characteristics arranged along the straight line in the horizontal direction to obtain the position of the construction.

Accordingly, the construction data extractor 141 extracts only the data over the predetermined road surface previously set from the distance distribution data, and the side wall straight line detector 142 extracts only the data within a side wall search region previously set, and the extracted data are processed by the Hough transformation, thereby detecting a linear equation showing presence or absence of the side wall and the position of the side wall. The side wall area detector 143 sets a side wall estimated region in which the side wall is estimated to exist on the basis of the straight line showing the position of the side wall, and detects the positions of before and after ends of the side wall in dependency on the distribution condition of the construction data in the side wall estimated region.

In detail, since the side wall is a portion of the construction, the construction data extractor 141 extracts the data of the construction over the road surface from the distance pictures. At this time, since the construction having the height under 0.1 meter is treated as the white line, stain and shadow on the road, such the data are deserted. Since the construction having a height over the vehicle roof is supposed as the pedestrian overpass and traffic sign, the data are also deserted. Accordingly, the extractor 141 selects only the data of the construction on the road.

Even though the construction data extractor 141 extracts the data of the construction with a wide area imaged in the screen, a limit is set for the side wall search area in the side wall straight line detector 142 because processing for the entire data in the wide area is not reasonable.

Figure 21:
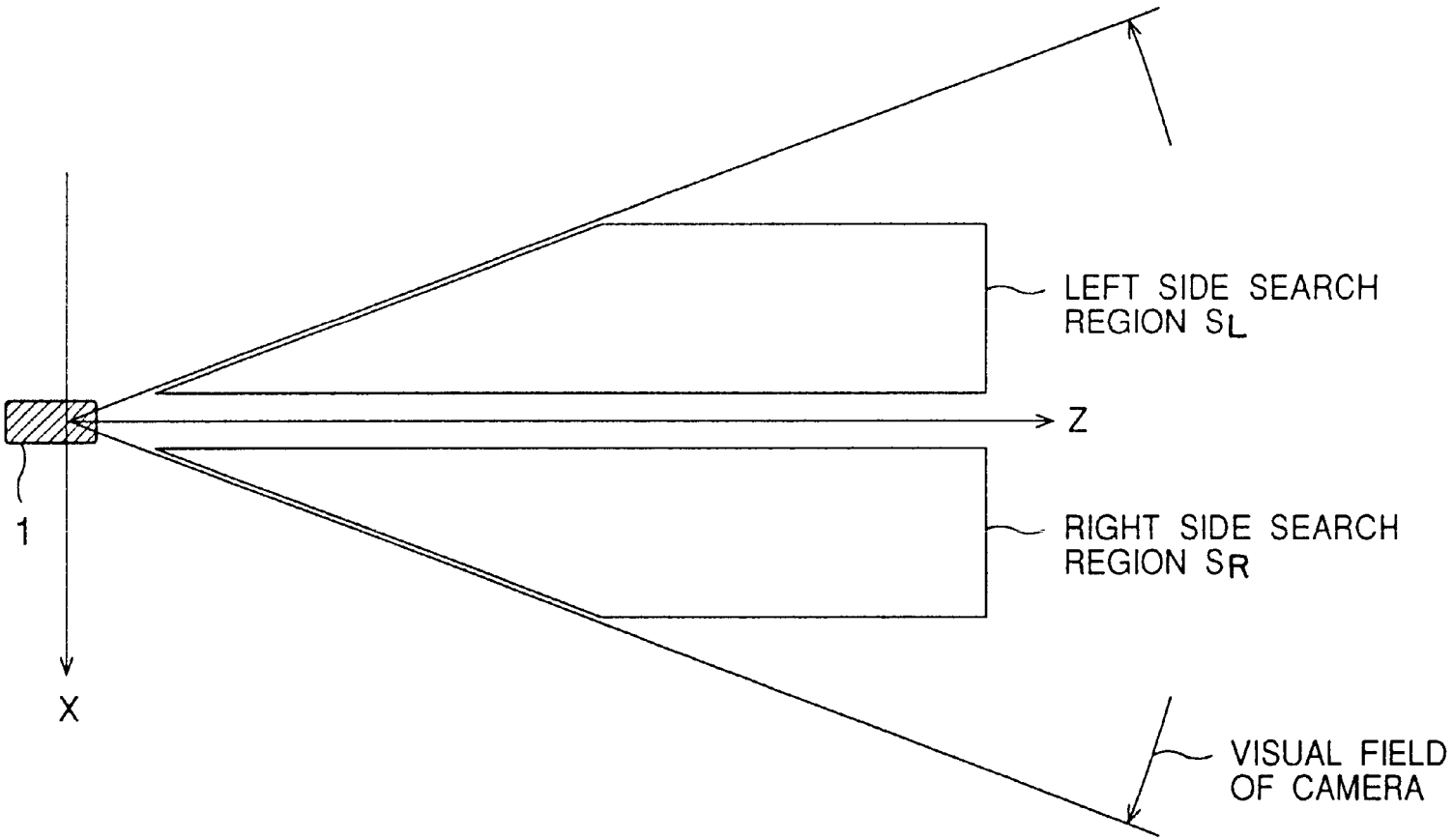
FIG. 21 an explanatory view showing a shape of a search region at detecting a side wall.

In this case, at overlooking an area in which the picture is measured, a visual field of the CCD camera 11 limits the bird eye's view to result FIG. 21. When the vehicle is normally running on the road, the side wall exists on the right and left sides of the vehicle 1 substantially along the vehicle. On the other hand, the side wall of the long distance is difficult to detect the distance data in view of the precision, and has little necessity of the detection. Accordingly, in view of these conditions, two search areas SL and SR are set on the left and right sides, and the side walls on the right side and the left side are particularly detected.

In other words, for detecting the side walls on the right and left sides, the side wall straight liner detector 142 set first the search area on the left side to perform the side wall straight line extraction processing and the side wall detection processing so as to detect the left side wall, and then, the side wall straight line detector 142 sets again the search area on the right side to perform the above mentioned processing so as to detect the right side wall.

In order to extract the construction data included in the search areas SL and SR, the three dimensional position (X and Z coordinates) of the object of each data extracted by the construction data extractor 141 is calculated to compare and judge the three dimensional position (X, Z) and each of search regions SR and SL.

Figure 22:
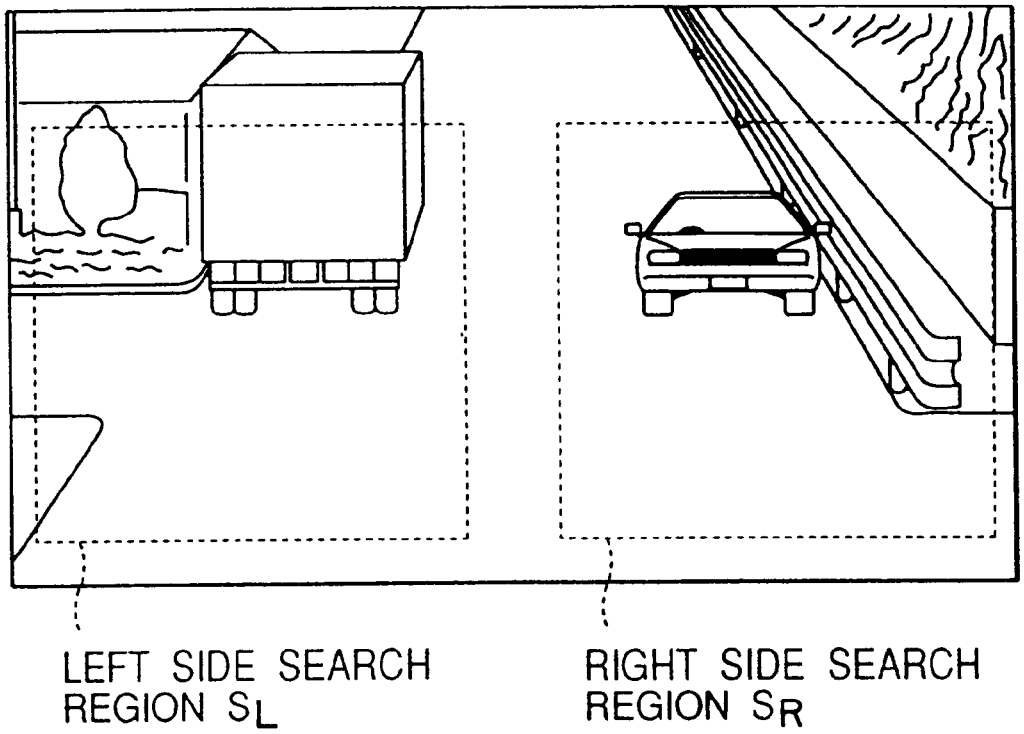
FIG. 22 is an explanatory view showing a side wall search region on a picture.
Figure 23:
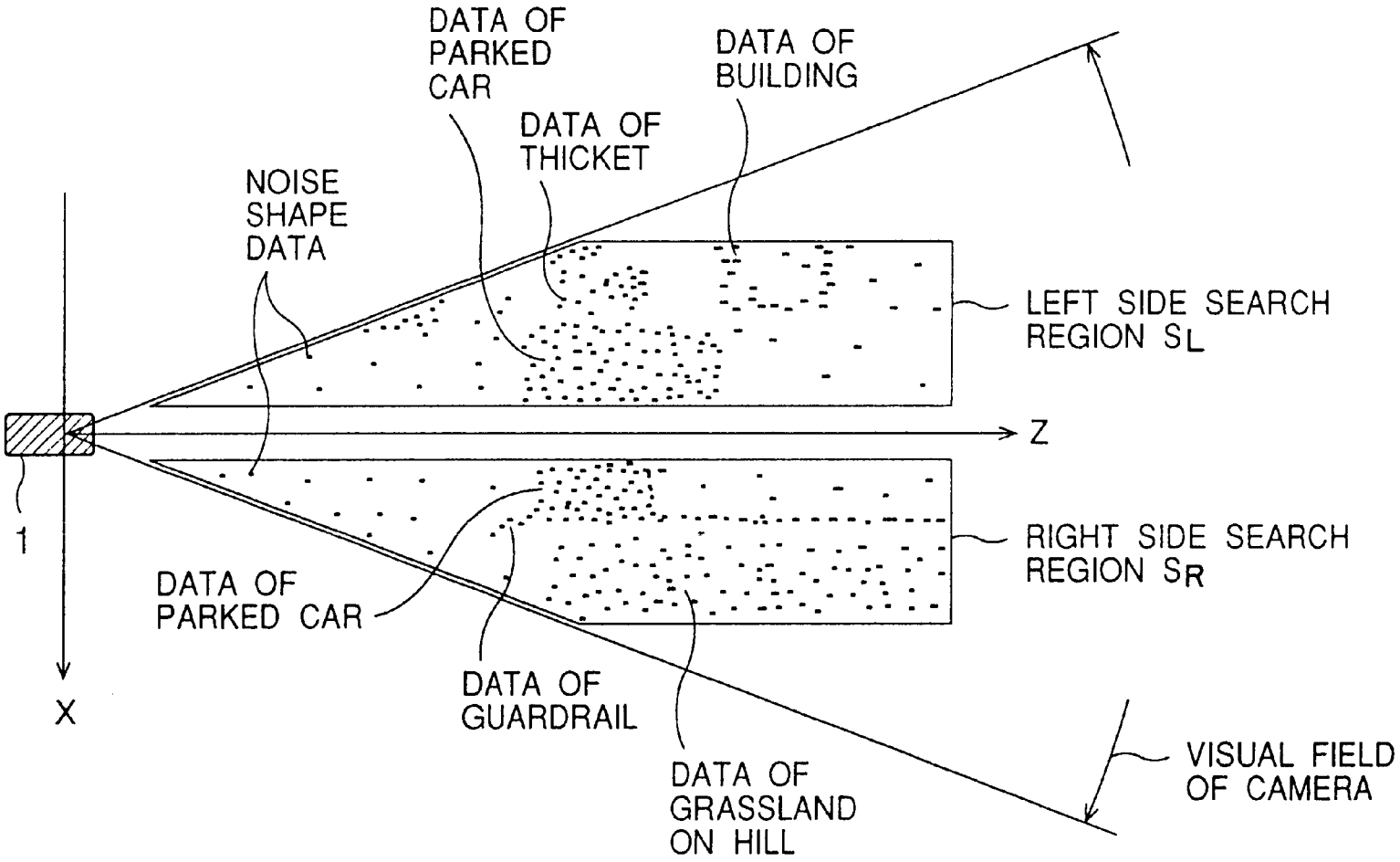
FIG. 23 is an explanatory view showing a distribution condition of construction data.

For example, in the condition shown in FIG. 22, each of the search regions SR and SL can be shown by a dotted line on the picture, and various constructions exist in the search region in addition to the side wall as an object. Furthermore, since the pseudo data having noises are included in the distance picture, only distributed data exist in the space in which the object does not exist actually. In FIG. 23 showing these data as a model, the sidle wall has the characteristic in which the data are arranged in the straight line. Accordingly, the side wall is detected by calculating the linear equation of the data train by using a Hough transformation.

There is described a detection of the linear equation by the Hough transformation. A straight line $F_i$ is assumed to pass through a construction data $P_i$ at point (coordinate $X_i$, $Z_i$) in FIG. 24. The linear equation is shown in an equation (8) as follows:

$$X=afi\times Z+bfi \tag{8}$$

Figure 25:
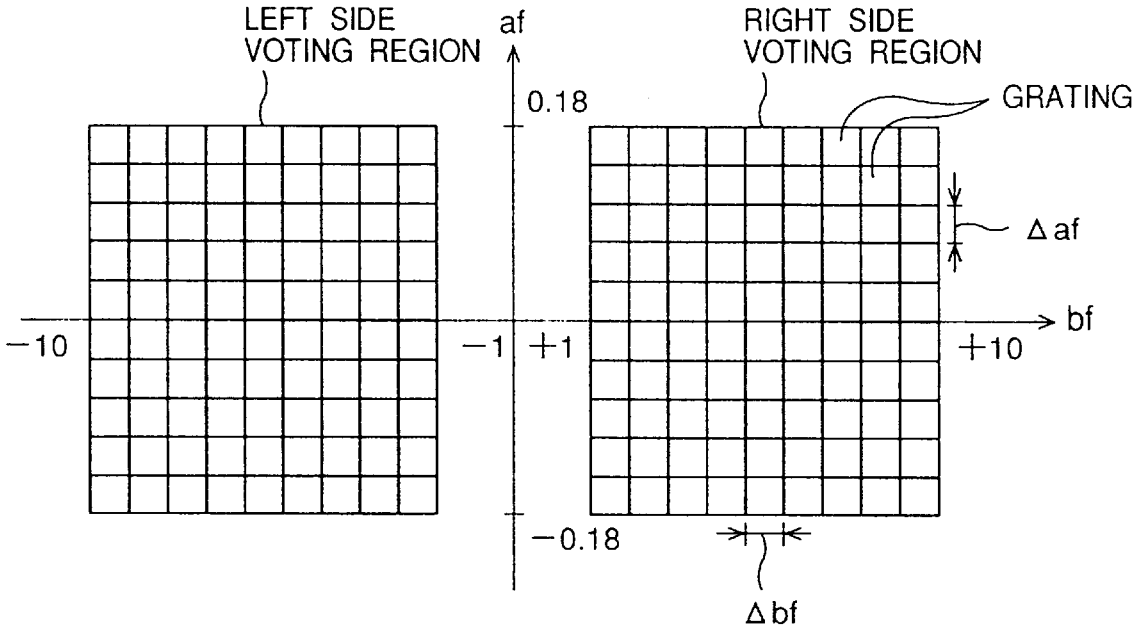
FIG. 25 is an explanatory view showing a voting region of a parameter space.

Next, as shown in FIG. 25, a parameter space is set to have a slant afi of the equation (8) as a vertical axis and a fragment bfi as a horizontal axis, and a voting is performed at the position corresponding to the parameters of afi and bfi in the equation.

Here, a value of the slant afi is practically sufficient to change in the range of ±20° (afi:±0.36) because the side wall is considered to be substantially parallel to the vehicle 1. A value of the fragment bfi is limited in a range of X=−1 to −10 meters as a left side of the vehicle when the left side wall is detected, and in a range of X=+1 to +10 meters as a right side when the right side wall is detected. In this manner, the reason why the limited range is within ±10 meters is that the detection of the side wall distant from the vehicle has little necessity for a practical use.

Such the limitation results in that the range of voting on the parameter space becomes a rectangular area as shown in FIG. 25, and the rectangular area is further divided into a plurality of gratings at each which a voting is performed. The slant afi in the equation (8) is within a predetermined change area (for example, ±10° to ±20°) and set at each interval Δaf of the gratings with a change one by one. The fragment bfi is calculated by substituting a set slant afi and a coordinate (Xi, Zi) of the construction data Pi for the equation (8), and the voting is performed for the grating corresponding to the parameter space if the calculated value is within the limit range.

The detected position of the side wall, namely, the detection accuracy of the slant and fragment in the linear equation is determined by the grating intervals Δaf and Δbf which are set by a requirement of the external apparatus using the side wall data. For example, the grating interval Δaf is desired to be 1°–2° and the grating interval Δbf 0.3–0.6 meters for using as a sensing means of such a dangerous condition as a collision when the vehicle is normally running on the road.

Figure 24:
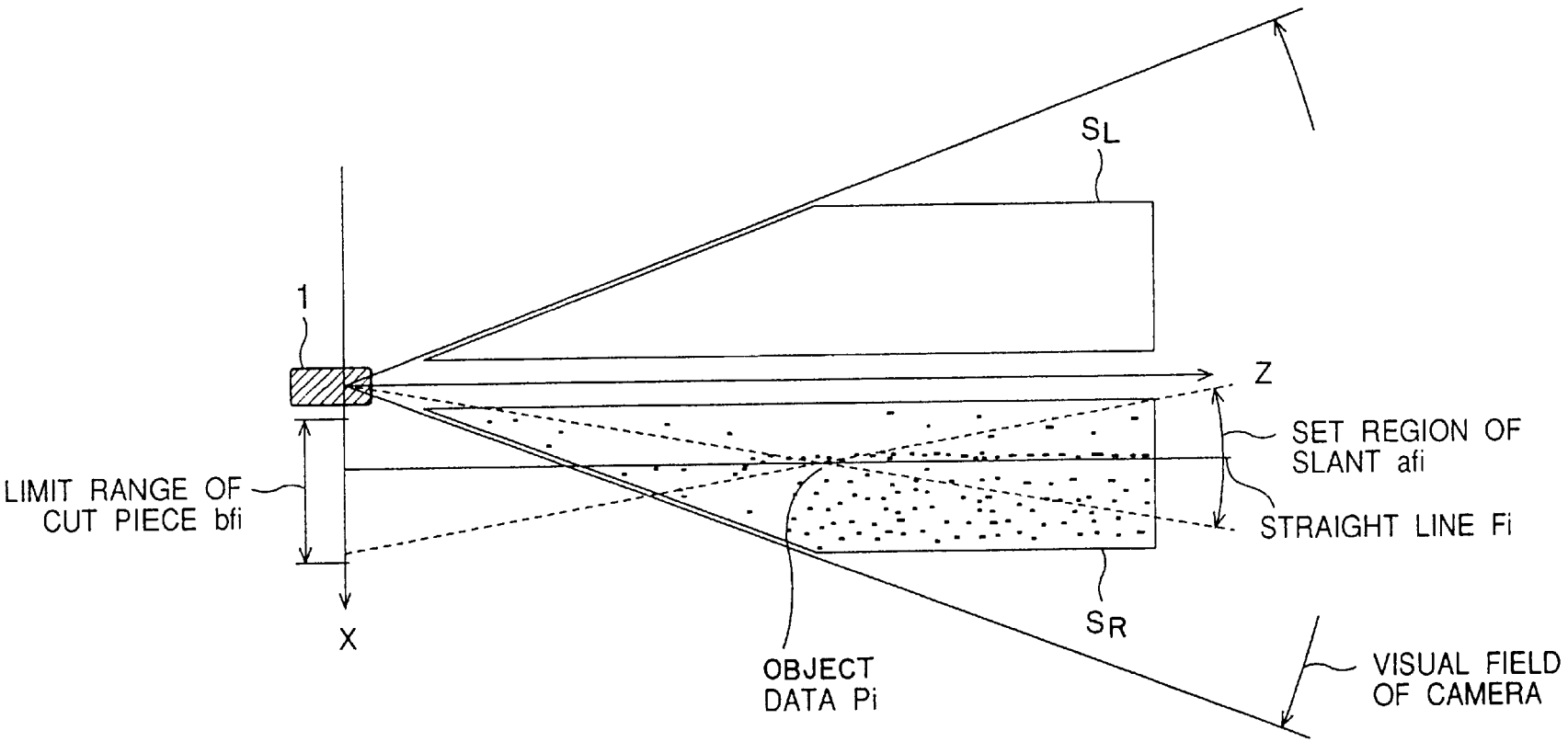
FIG. 24 is an explanatory view showing an idea of a straight line in Hough transformation.

As described above, the voting of the parameter space is performed with entire construction data in the search region. At this time, as shown in FIG. 24, if the data arranged along the straight line exist, the grating corresponding to the straight line parameter afi and bfi which are set in the manner of coinciding with the data train, obtains many votes to appear locally maximum values at each left and right voting region SL and SR.

The locally maximum value become a large value when the side wall exists and clear construction data train exists, but the locally maximum values becomes a small value when the side wall does not exist and a plurality of objects are sporadical existing. Accordingly, the locally maximum values are detected at each of the left and right voting region SL and SR in the parameter space, thereby judging an existence of the side wall if the detected locally maximum values are more than a judge value. The judge value is set under the consideration of a size of the set search region and distance between the gratings.

When the side wall straight line detector 142 judges that the side wall exists, the side wall region detector 143 detects the positions of the front and rear ends of the side wall. When the parameters af and bf are read out corresponding gratings of the locally maximum values, the side wall is estimated to be along the linear equation (9) below, so as to be the straight line $F_f$ as shown in FIG. 26 when the detected linear equation is shown from an example of FIG. 24.

$$X=af\times Z+bf \tag{9}$$

Figure 26:
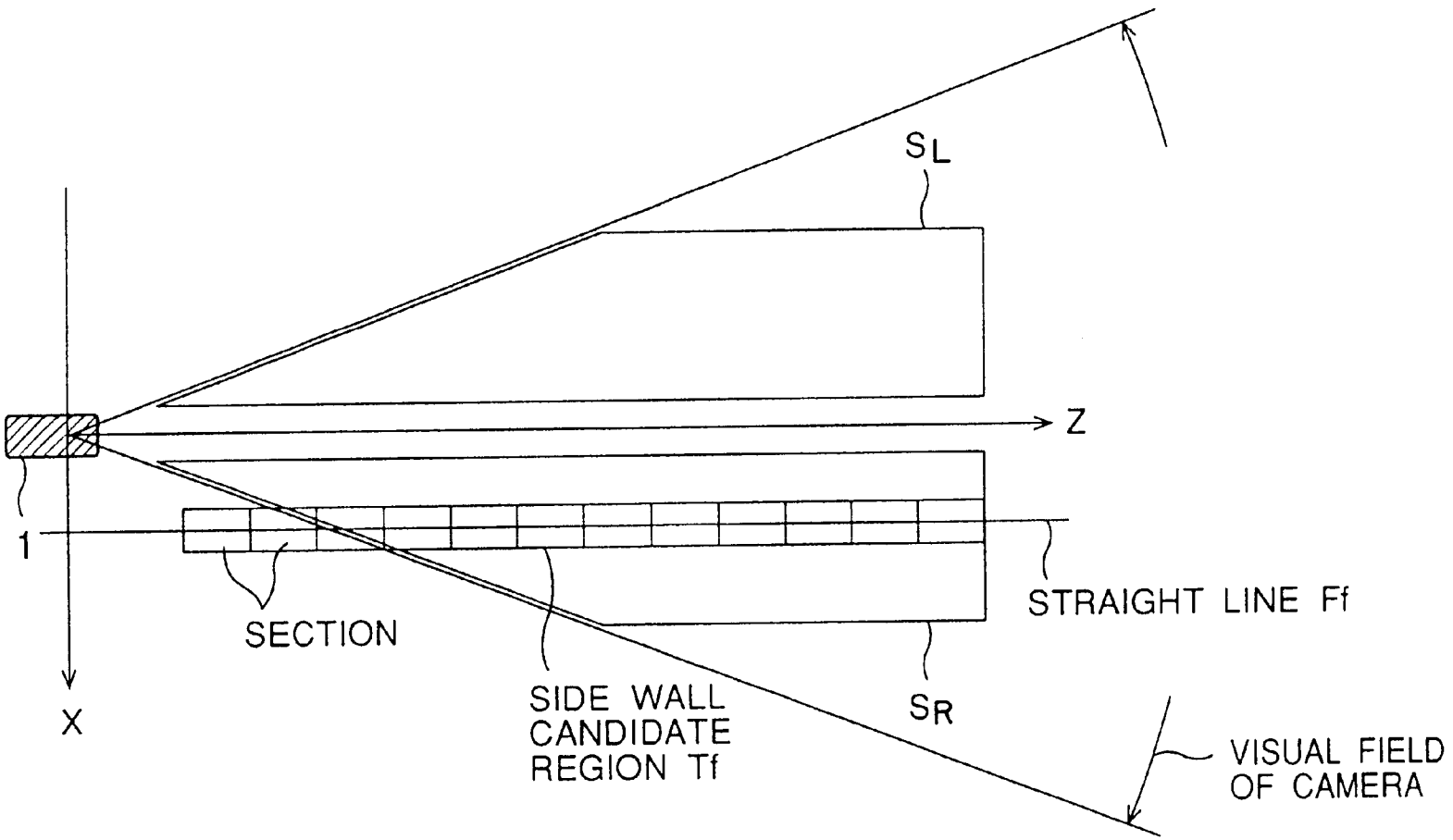
FIG. 26 is an explanatory view showing a side wall candidate region.

When the region of width 0.3–1.0 meters at the center of the straight line $F_f$ is supposed to be a side wall candidate region $T_f$, the region is divided in the Z direction as shown in FIG. 26. The width of the side wall candidate region $T_f$ is set from the grating distance Δbf of the parameter space under the consideration of data errors and the like.

Figure 27:
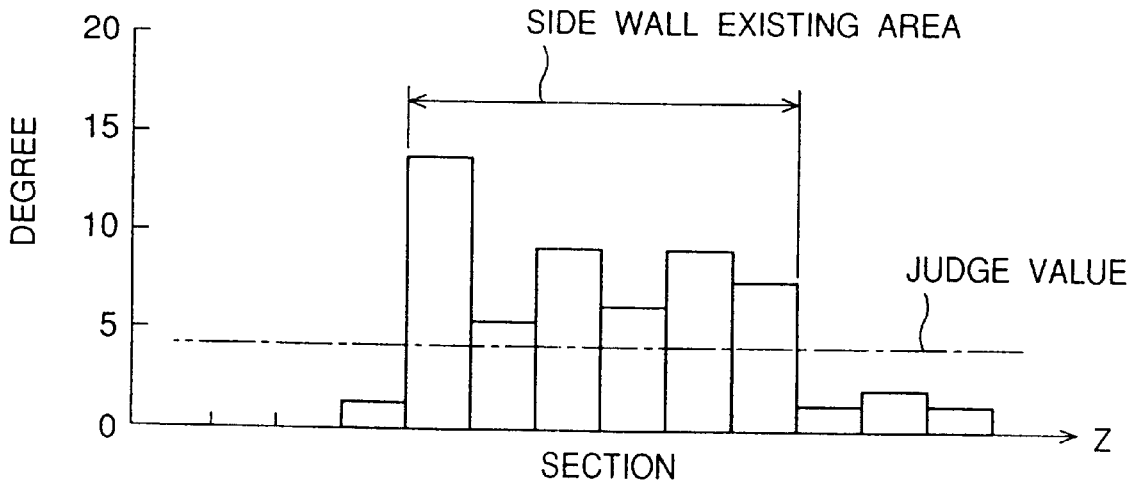
FIG. 27 is an explanatory view showing a relationship between a histogram and a region in which a side wall existed.

Next, the construction data in the search region are sequentially surveyed to extract only the data within the side wall candidate region $T_f$. After that, a number of the construction data is counted at each section to form the histogram. The histogram is shown in FIG. 27 as a model, in which a portion included by the side wall shows a large degree. Accordingly, it is possible to judge that the side wall exists in the region by detecting the section in which the degree is on or over the judge value, thereby setting the front and rear ends positions by calculating the three dimensional position of the side wall. In the example shown in FIG. 24, an upper end of the search region SR is regarded as the rear end position of the side wall (guardrail 400).

Figure 28:
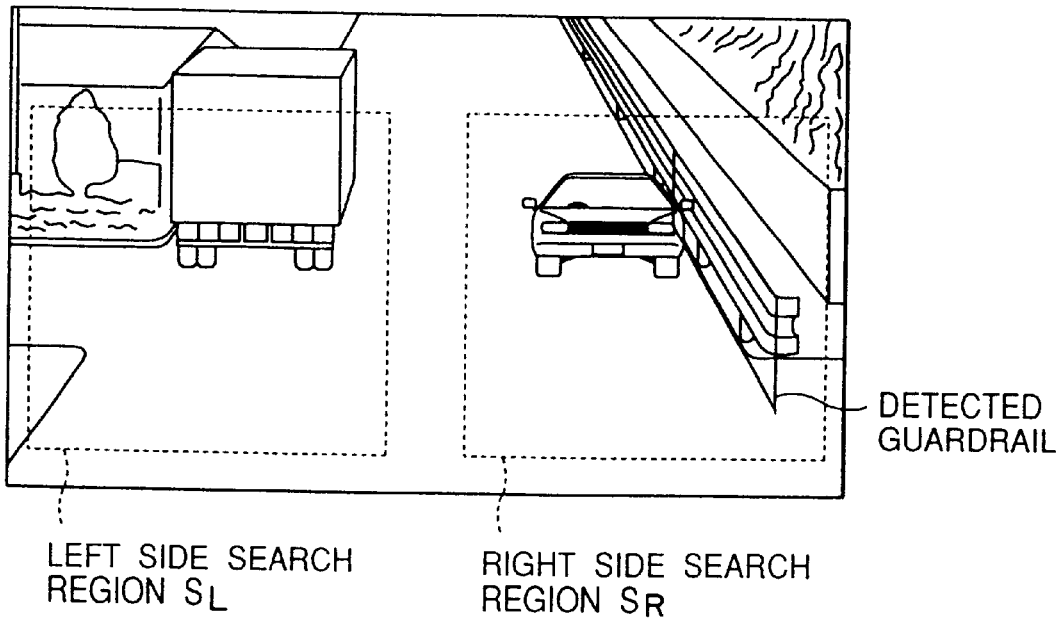
FIG. 28 is an explanatory view showing a detected result of the side wall.

FIG. 28 shows the side wall detected by the above processing as a frame line. In this example, the guardrail 400 at the right side can be detected.

As described above, it is possible to obtain the parameters such as a position and shape of each object on the road in dependency on the distance picture to write in the construction parameter storage portion 150. Then, the gap distance calculator 160 formed by the microprocessor 120c calculates the gap distance of right and left between the vehicle 1 and the detected object.

Figure 29:
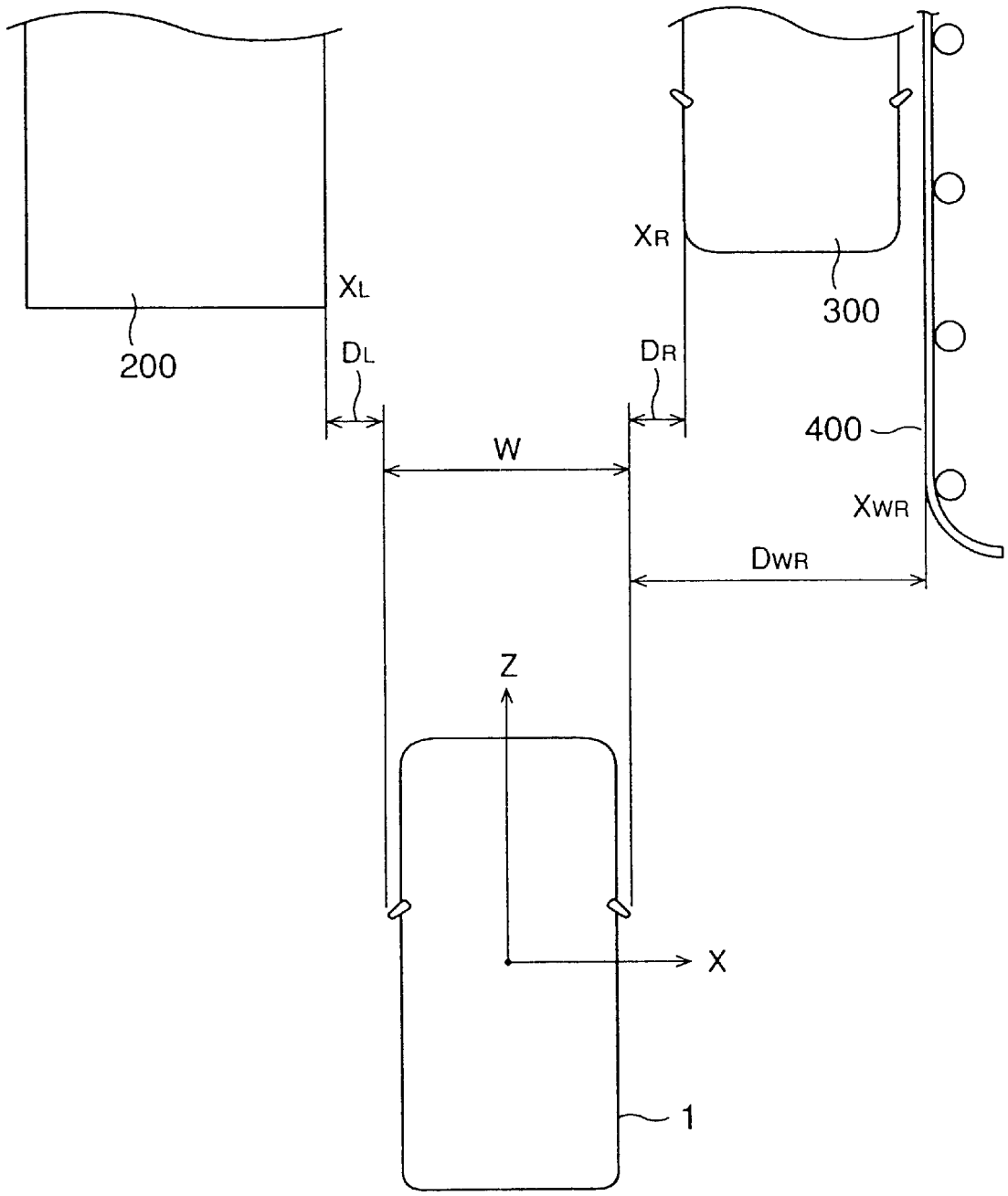
FIG. 29 is an explanatory view of a gap distance calculation.

In the example of the picture shown in FIG. 9, for example, when an X coordinate $X_L$ is a side of the parked car 200, an X coordinator $X_R$ is a side of the parked car 300, and an X coordinate $X_{WR}$ is an end of the guardrail 400 as shown in FIG. 29, a distance $D_L$ between the extending line of the left side of the vehicle 1 and the parked car 200 on the left side is calculated from an equation (10), a distance $D_R$ between the extending line of the right side of the vehicle 1 and the parked car 300 on the right side is calculated from an equation (11), and a distance $D_{WR}$ between the extending line of the right side of the vehicle 1 and the guardrail 400 on the right side is calculated from an equation (12) when a width of the vehicle 1 is W:

$$D_L=|X_L|-W/2 \quad (10)$$

$$D_R=|X_R|-W/2 \quad (11)$$

$$D_{WR}=|X_{WR}|-W/2 \quad (12)$$

A calculation is performed at each edge by the equations (10), (11) and (12) to obtain the minimum values on the left and right sides. The minimum values become the nearest distance, namely, a gap distance. The gap distance is added with a little room for a rear view mirror of the object car to display the picture on the display 3, as shown in FIG. 3.

In the picture example shown in FIG. 9, since the distance $D_R$ between the parked car and the vehicle 1 is smaller than the distance $D_{WR}$ between the guardrail 400 and the vehicle 1, the distance $D_R$ is adopted as the right gap distance to output the display 3.

A threshold value such as 1 meter is provided for the numerical value of the gap distance for displaying on the display 3, and a numerical value over the threshold value is not displayed. Because it does not make sense to display the numerical value when the gap is sufficiently large.

Next, there will be described operation of the image processor 20 and the distance picture processing computer 120.

Figure 30:
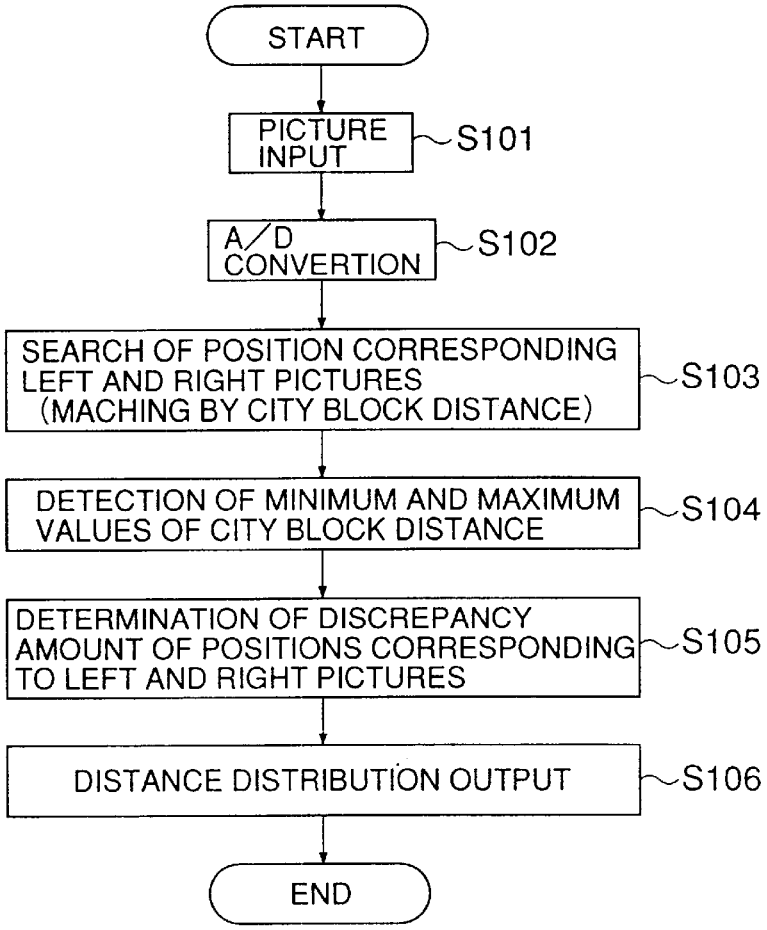
FIG. 30 is a flow chart showing operation of an image processor.

FIG. 30 is a flow chart showing a flow of operation of the image processor 20. In step S101, the pictures are imaged by the CCD cameras 11a and 11b on the left and right sides to input. In step S102, after the input analog pictures are converted by the A/D converter 31a and 31b into digital pictures having a predetermined luminance gradation, the LUTs 32a and 32b perform a characteristic compensation of the CCD camera 11a and 11b on the right and left sides and a contrast increase of the low luminance component so as to store the picture data in the picture memories 33a and 33b.

The pictures stored in the memories 33a and 33b are only lines necessary to the processing in the following steps within the entire lines of the CCD elements of the CCD cameras 11a and 11b, and are rewritten at a rate of one time per 0.1 second (a rate of one per three in the TV picture).

Next, in step S103, the right and left picture data having four lines are read from the picture memories 33a and 33b for the right and left pictures through the common bus 80 to input buffer memories 41a, 41b, 42a and 42b so as to estimate a matching, namely, a coincidence between the right and left pictures previously read in.

At that time, reading and writing operations are alternatively repeated, in which the reading operation is performed from the picture memories 33a and 33b to the input buffer memories 41a, 41b, 42a and 42b, and the write operation is performed to the shift register 43a, 43b, 44a and 44b. For example, in the left picture, while the picture data are read from the picture memory 33a to the buffer memory 41a on one side, the picture data are written from the input buffer on the other side into the shift register 43b. In the right picture, while the picture data are read from the picture memory 33b to the buffer memory 42a on one side, the picture data are written from the buffer memory 42b on the other side into the shift register 44b.

Figure 31:
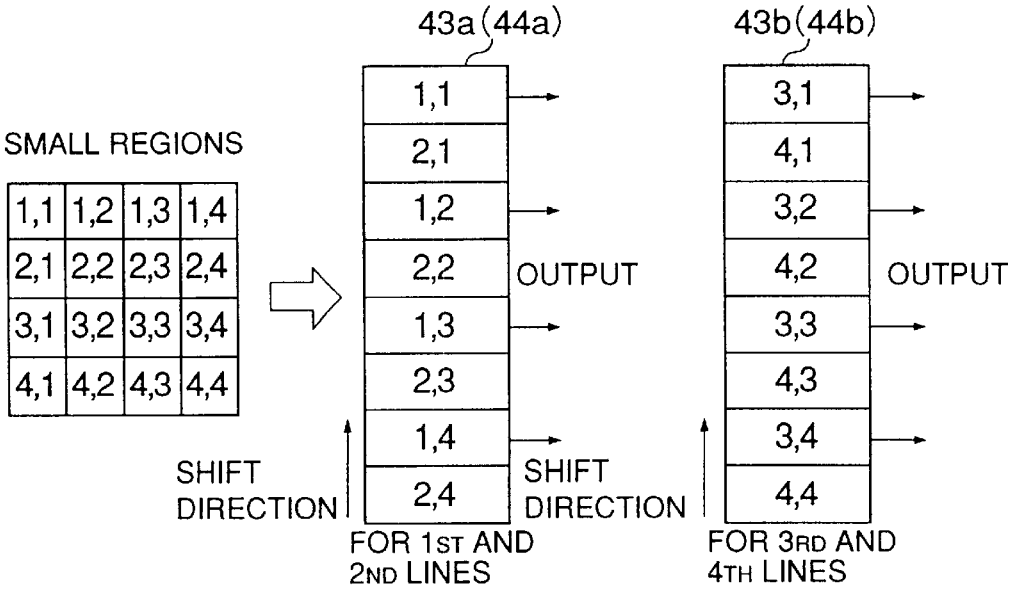
FIG. 31 is an explanatory view showing a storing order in a shift register.

As shown in FIG. 31, the shift registers 43a, 43b, 44a and 44b store picture data (1, 1) through (4, 4) of the small regions of 4 by 4 pixels in the right and left, in which the shift register 43a(44a) stores data of first and second lines and the shift register 43b (44b) stores data of third and fourth lines respectively in the order of the odd numbered line and the even numbered line for each one pixel. Each of the shift registers 43a, 43b, 44a and 44b has: an independent transfer line, and the data of 4 by 4 pixels are transferred by 8 clocks, for example.

The contents of the even numbered stages in 8 stages are instantaneously outputted from the shift registers 43a, 43b, 44a and 44b to the city block distance calculation circuit 45. When the calculation of the city block distance H starts, the right picture data are stored in the shift register 44a and 44b, and the odd numbered line data and even numbered line data are alternatively outputted at each clock. On the other hand, the left picture data are continued to transfer to the shift registers 43a and 43b, and then the odd numbered line data and the even numbered line data are alternatively outputted and the data are shifted and replaced to the right one pixel per 2 clocks. This operation is repeated until the replacement of 100 pixels (200 clocks).

After that, when the transfer is completed with respect to one small region, the process in next small region starts by setting the contents (an initial address in the small region of 4 by 4 pixels) in the right picture address counter into the left picture address counter in a #2 address controller 87.

Figure 32:
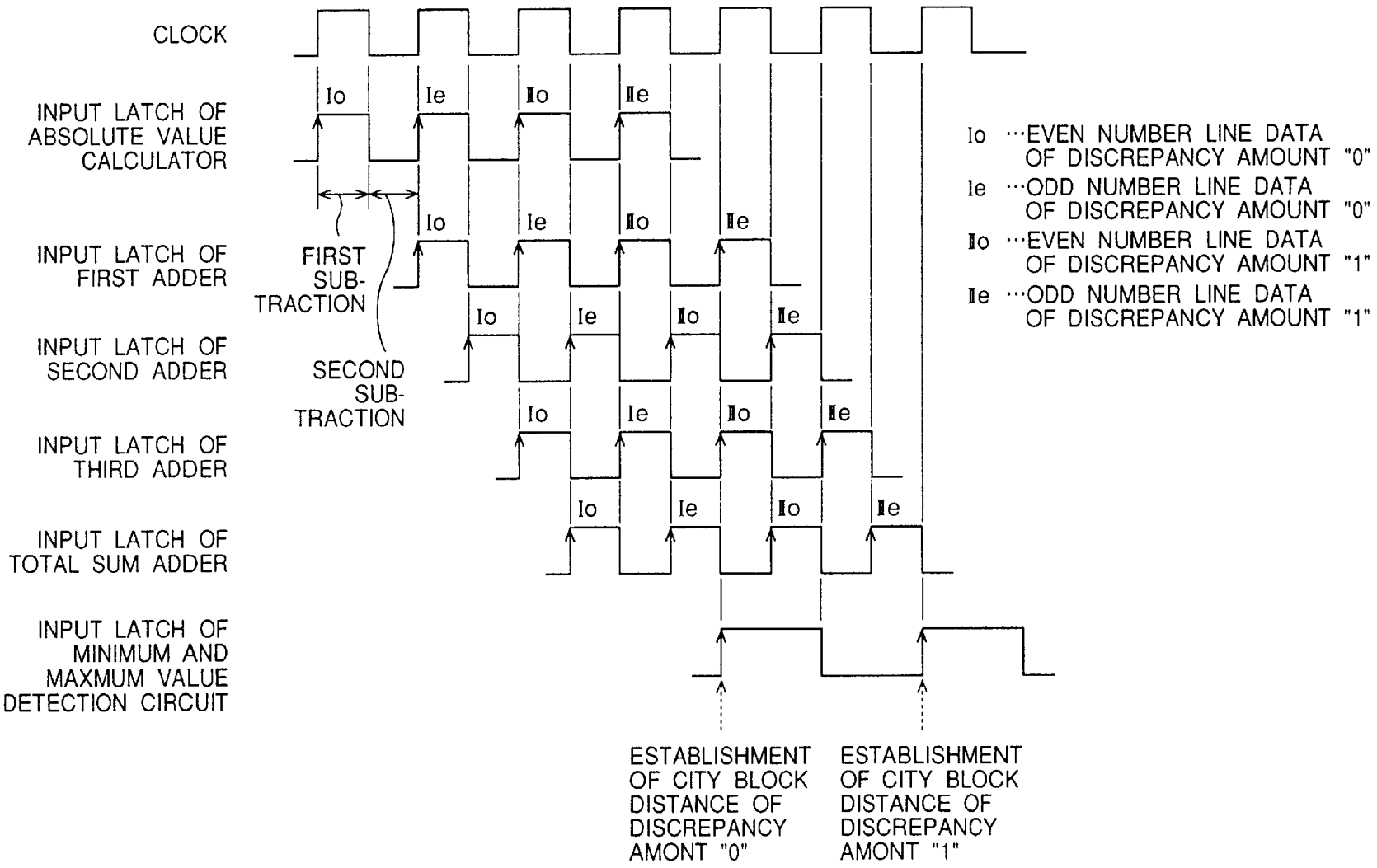
FIG. 32 is a timing chart showing operation of a city block distance calculation circuit.

In the city block distance calculation circuit 45, as shown in the timing chart of FIG. 32, the data for the eight pixels are first inputted into an absolute value calculator at the first stage of the pyramid constitution to calculate an absolute value of the luminance difference between the right and left pictures, namely, the luminance of the left picture is subtracted from the luminance of the corresponding right picture. When the subtracted result is negative, the subtraction is performed again by changing the subtraction positions each other to calculate the absolute value. Accordingly, there is once an occasion in which two subtractions are performed in the initial stage.

Next, after the initial stage is completed, two instantaneous input data are added by the first through third adders in second through fourth stages to output added data. Then, a total sum adder in the final stage adds two continuous data each other to calculate a total sum, so as to output the city block distance H for necessary sixteen pixel components every two clocks to the minimum and maximum value detector 50.

Next, in step S104, the maximum value $H_{MAX}$ and the minimum value $H_{MIN}$ are detected for the city block distance H which is calculated in step S103. As mentioned above, the detections of the maximum value $H_{MAX}$ and the minimum value $H_{MIN}$ are the same each other except the opposite logic and a storage of the discrepancy amount. Accordingly, there will be later the detection of the minimum value $H_{MIN}$ as a representation.

First, the city block distance H (the discrepancy amount x=0) of the first output is supplied through the C latch 53 of the minimum value detection circuit 51 shown in FIG. 8 to the B register 46b of the calculator 46. The city block distance H (the discrepancy amount δ=1) which is outputted at the next clock, is supplied to the C latch 53 and the calculator 46. The calculator 46 starts the comparison calculation with the B register 46b at the same time of the input of the city block distance H.

As a result of the comparison calculation in the calculator 46, if the contents in the A register 46a are smaller than the contents in the B register 46b, the contents in the C latch 53 (namely, the contents in the A register 46a) are transferred to the B register 46b at the next clock, and the discrepancy amount δ at this time is stored in the D latch 55. At the same time of this clock, the next city block distance H (the discrepancy amount δ=2) is supplied to the A register 46a and the C latch 53 to start the comparison calculation again.

In this manner, while the minimum value in the middle of the calculation is usually stored in the B register 46b and the discrepancy amount δ at this time is stored in the D latch 55, the calculation is continued until the discrepancy amount becomes 100. When the calculation is completed (namely, 1 clock after the final city block distance H is outputted), the contents in the B register 46b and the D latch 55 are read in the discrepancy amount determiner 60.

During this processing, the above-mentioned city block distance calculation circuit 45 reads the initial value of the next small region not to generate a dead time. Even though four clocks are taken for the calculation of one city block distance H, since the circuit 45 has the pipe line constitution, new calculation results can be obtained at every two clocks.

When there are established the minimum value $H_{MIN}$ and the maximum value $H_{MAX}$ of the city block distance H in step S104, the discrepancy amount determiner 60 checks the above mentioned three conditions to determine the discrepancy amount x in step S105.

Figure 33:
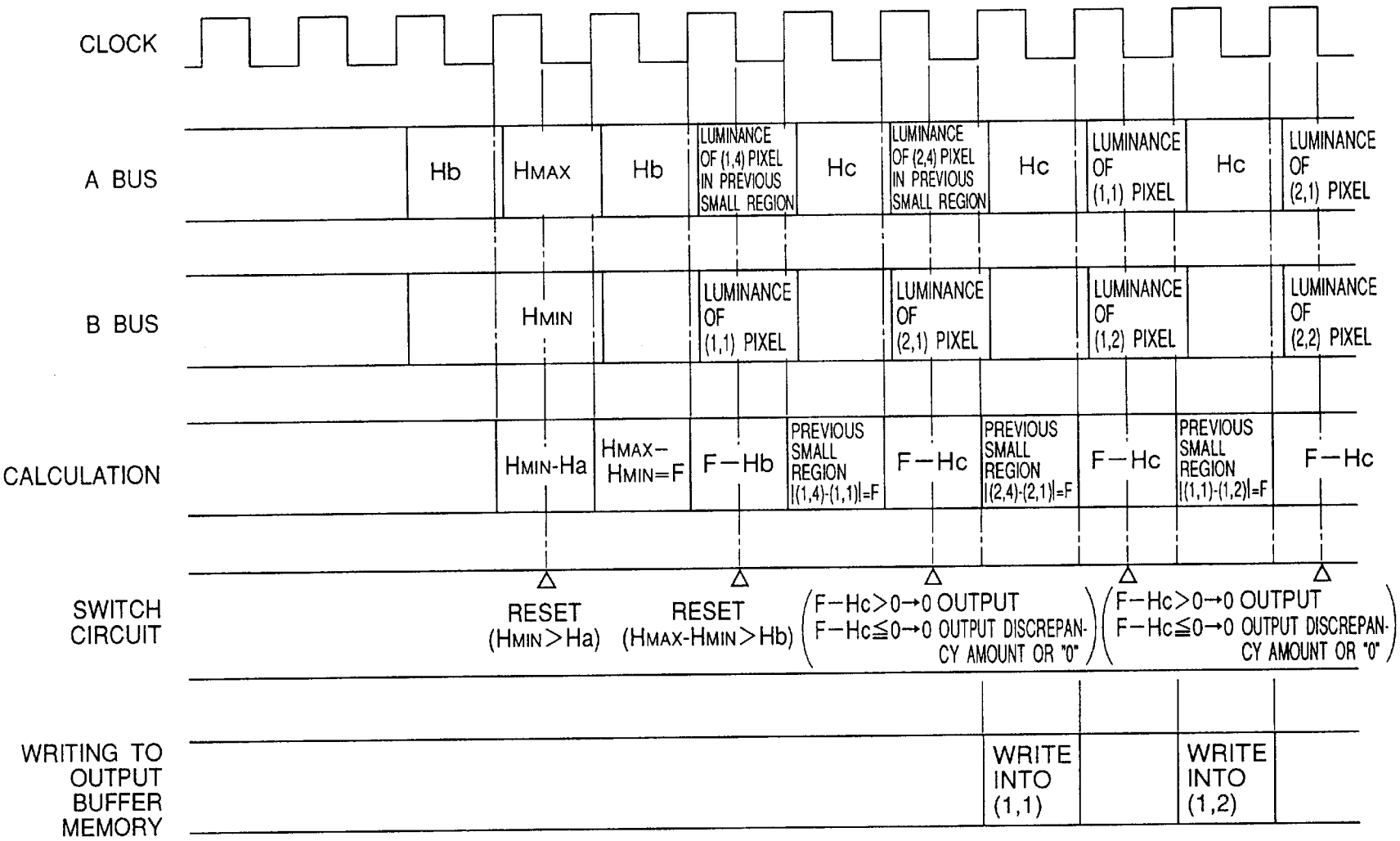
FIG. 33 is a timing chart showing operation of a miss amount determiner.

Accordingly, as shown in FIG. 33, the minimum value $H_{MIN}$ is latched through the B bus 62b in the B register 72, and the threshold value $H_A$ which is compared with the value in the B register 72 is latched through the A bus 62a in the A register 71. Then, the ALU 70 compares both values. When the minimum value $H_{MIN}$ is larger than the threshold value $H_A$, the switch circuit 65 is reset to usually output "0" in spite of the any check later.

Next, the maximum value $H_{MAX}$ is latched by the A register 71, and the difference between the maximum value $H_{MAX}$ latched in the A register 71 and the minimum value $H_{MIN}$ latched in the B register 72 is calculated to output the calculation result to the F register 73. The A register 71 latches the threshold value $H_B$ at the next clock, and compares it with the value in the F register 73. The switch circuit 65 is reset in the same manner when the contents in the F register 73 are smaller than the threshold[ value $H_B$ latched by the A register 71.

From the next clock, it starts to calculate the luminance difference between the adjacent pixels. Two shift registers 64a and 64b respectively have ten stage constitution for storing the luminance data and connected to rear stages of the shift registers 44a and 44b of the city block distance calculator 40, in which the shift register 44a is for the first and second lines and the shift register 44b is for the third and fourth lines. Outputs of the shift registers 64a and 64b are taken from the final stage and two before the final stage to output to the A bus 62a and the B bus 62b, respectively.

When the calculation of the luminance difference starts, each stage in the shift registers 64a and 64b stores the luminance data of each plate in the small regions, and the A register 71 and the B register 72 in the calculator 61 first latch the luminance data at the fourth column in the first row of the previous small region and the luminance data at the first column in the first row of the present small region, respectively.

The calculator 61 calculates an absolute value of the difference between the content in the A register 71 and the content in the B register 72 to store the calculated result in the F register 73. The A register 71 latches the threshold value $H_C$ by the next clock to compare it with the value in the F register 73.

As a result in the calculator 61, if the content (the absolute value of the luminance difference) in the F register 73 is larger than the content (threshold value $H_C$) of the A register 71, the switch circuit 65 outputs the discrepancy amount x or "0". To the contrary, when the content in the F register 73 is smaller than the content in the A register 71, the switch circuit 65 outputs "0" to write it at the position in the first column in the first row in the small region corresponding to the output buffers 66a and 66b.

While the calculator 61 compares the luminance difference between the adjacent pixels with the threshold value $H_C$, the shift registers 64a and 64b shift one stage, respectively. Then, the calculator 61 starts to calculate with respect to the luminance data at the fourth column in the second row in the previous small region and the luminance data at the first column in the second row in the present small region. In this manner, after the alternative calculation is performed with the first and second rows in the small region, the same calculation is performed with respect to the third and fourth rows.

During the calculation, a ring register is formed by connecting the final stage of the shift register 64a with the first stage of the shift register 64b. When two shift clocks are added after the calculation is performed with the entire small regions, the content in the register returns to the condition before the calculation. When the luminance data in the next small region are completed to transfer, the data in the fourth row in the present small region are maintained in the final and previous stages.

In this manner, since the next data are provided in and the calculation results are written in the A bus 62a and B bus 62b during the calculation for determining the discrepancy amount, one data is processed only by two clocks necessary to the calculation. As a result, entire calculation is completed within 43 clocks even though the initial check for the minimum value $H_{MIN}$ and the maximum value $H_{MAX}$ is included, and it is sufficient for a time to obtain the minimum value $H_{MIN}$ and the maximum value $H_{MAX}$ of the city block distance H against one small region, thereby adding further function.

When the discrepancy amount is determined, in step S106, the discrepancy amount x is outputted as the distance distribution information from the output buffer memories 66a and 66b to the dual port memory 90 so as to end the processing in the image processor 20.

The output buffer memories 66a and 66b have the capacity of four lines, for example, in the same manner of the above-mentioned input buffer memories 41a, 41b, 42a and 42b. While the distance distribution data are written into one pair of two pairs, the data are transferred from another pair of two pairs to the dual port memory 90.

It is possible to calculate the three dimensional position in the XYZ space of the object corresponding to each pixel from the distance distribution information which is written into the dual port memory 90 in dependency on the lens parameter such as an attached position and a focal point of the CCD cameras 11 and 12, thereby precisely detecting the distance the object outside the vehicle without deterioration of the data amount.

Figure 34:
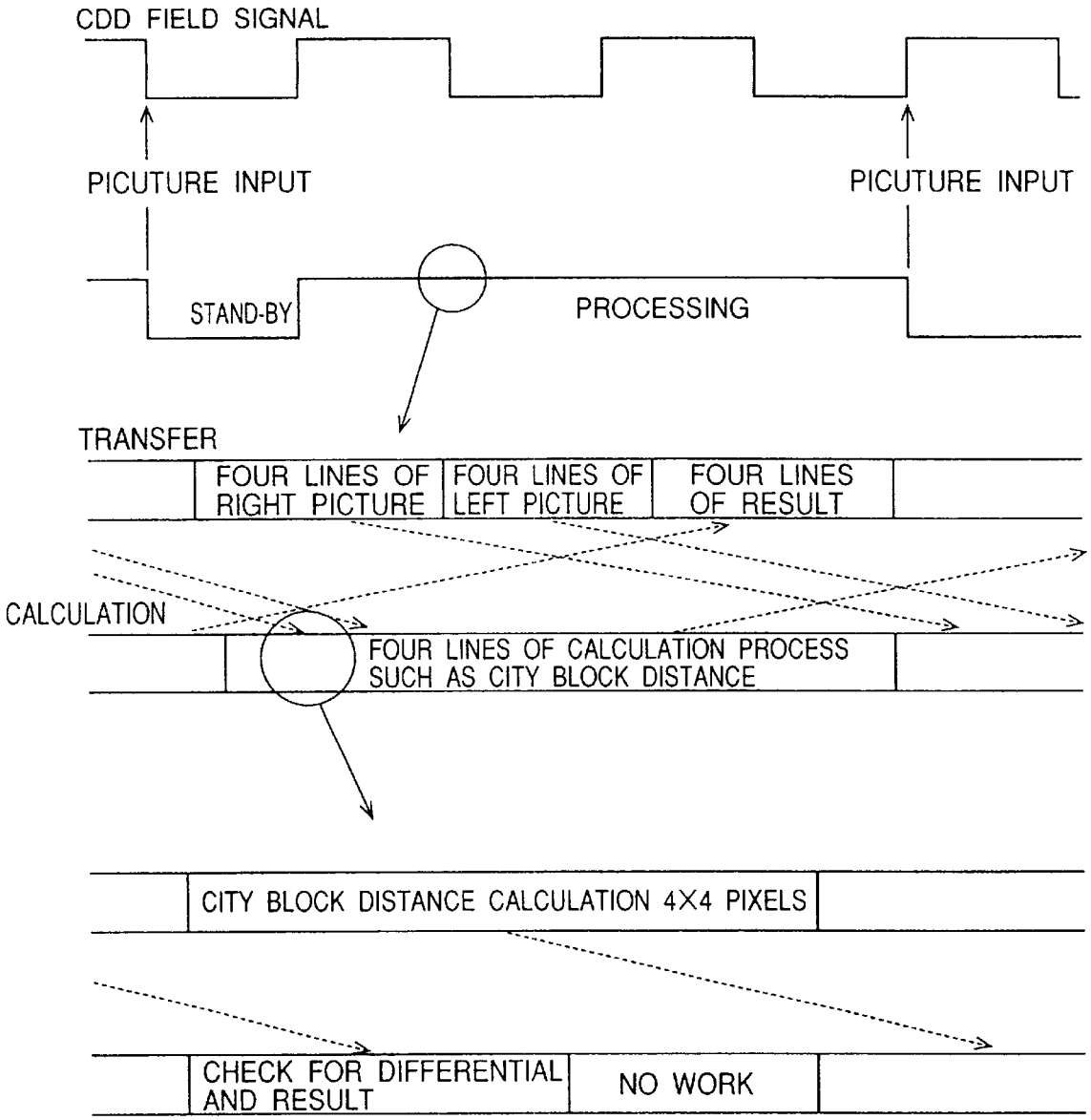
FIG. 34 is a timing chart showing entire operation of the image processor.

Here, entire timing of the image processor 20 will be described in accordance with the timing chart shown in FIG. 34.

At first, the picture memories 33a and 33b write in oneself the field signal from the left and right CCD cameras 11a and 11b synchronizing each other at the timing of each 0.1 second (a rate of one picture per three pictures).

Next, a block is transferred at each four lines after receiving a taking end signal. The transfer is performed by transferring three blocks of the right picture, the left picture and the distance distribution picture as a result in the order.

During this, a calculation is performed with respect to a discrepancy amount δ for one of the input and output buffer memories. After a predetermined time passes through under the consideration of the calculation time of the discrepancy amount 67 , a transfer is performed to the other of the input and output buffer memories.

A hundred of calculations is performed about the city block distance H against a small region of four by four pixels of one right picture because the calculation is performed by shifting a hundred pixels about the left picture. During the calculation is performed with respect to the city block distance H in one region, the discrepancy amount δ in the previous one region is outputted as the distance distribution after each checking.

When the line number to be processed is two hundreds, a processing for four lines is repeated in fifty times, thereby requiring a processing time eight lines of four lines to transfer the initial data when starting the calculation, and of four lines to transfer the final result to the picture recognizing portion after the calculation is completed.

A time is 0.076 second as a result of the actual circuit operation from the start of the transfer of the initial input picture line to the end of the transfer of the final distance distribution.

Figure 35:
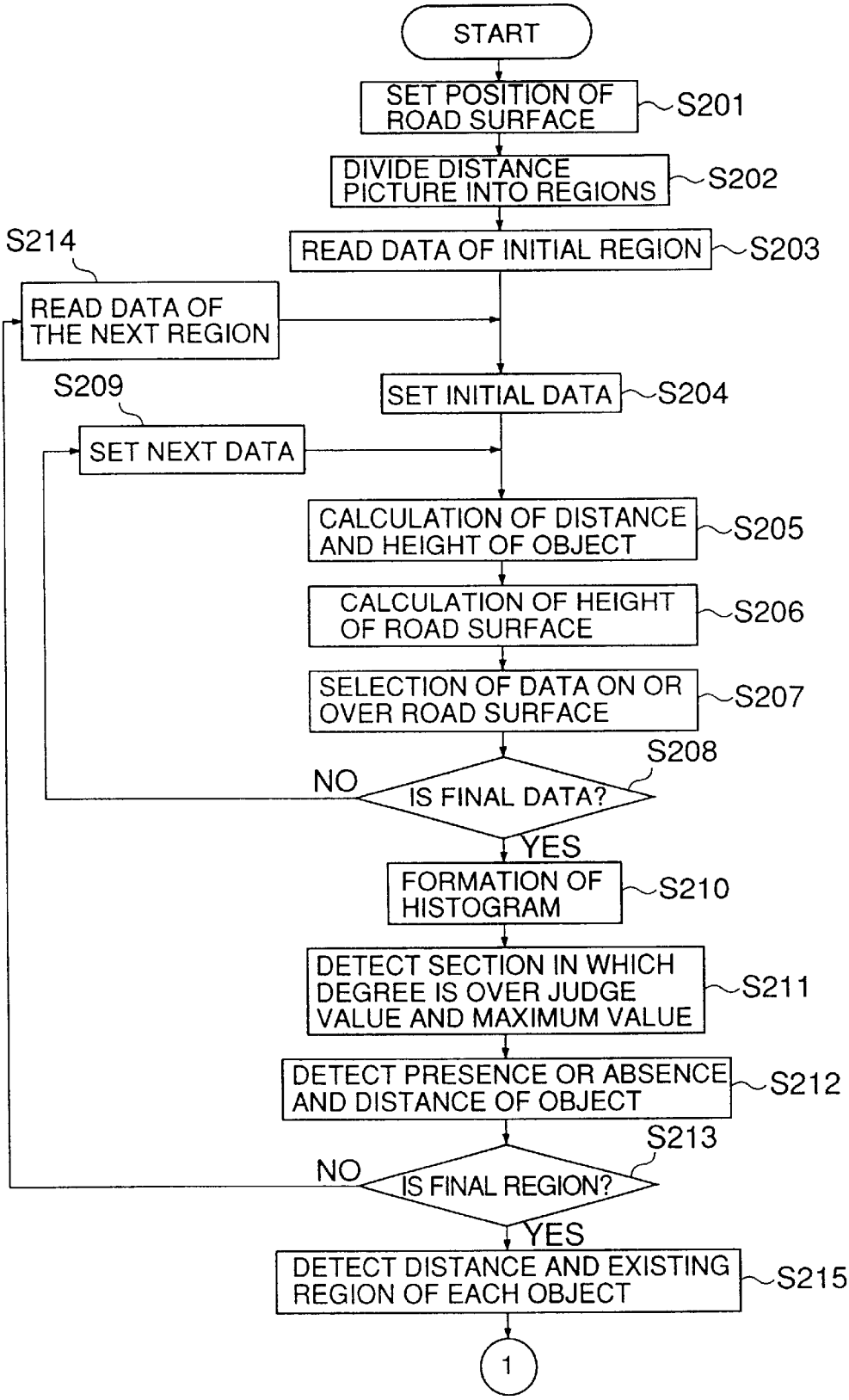
FIGS. 35 and 36 are flow charts of object detection processing, respectively.
Figure 36:
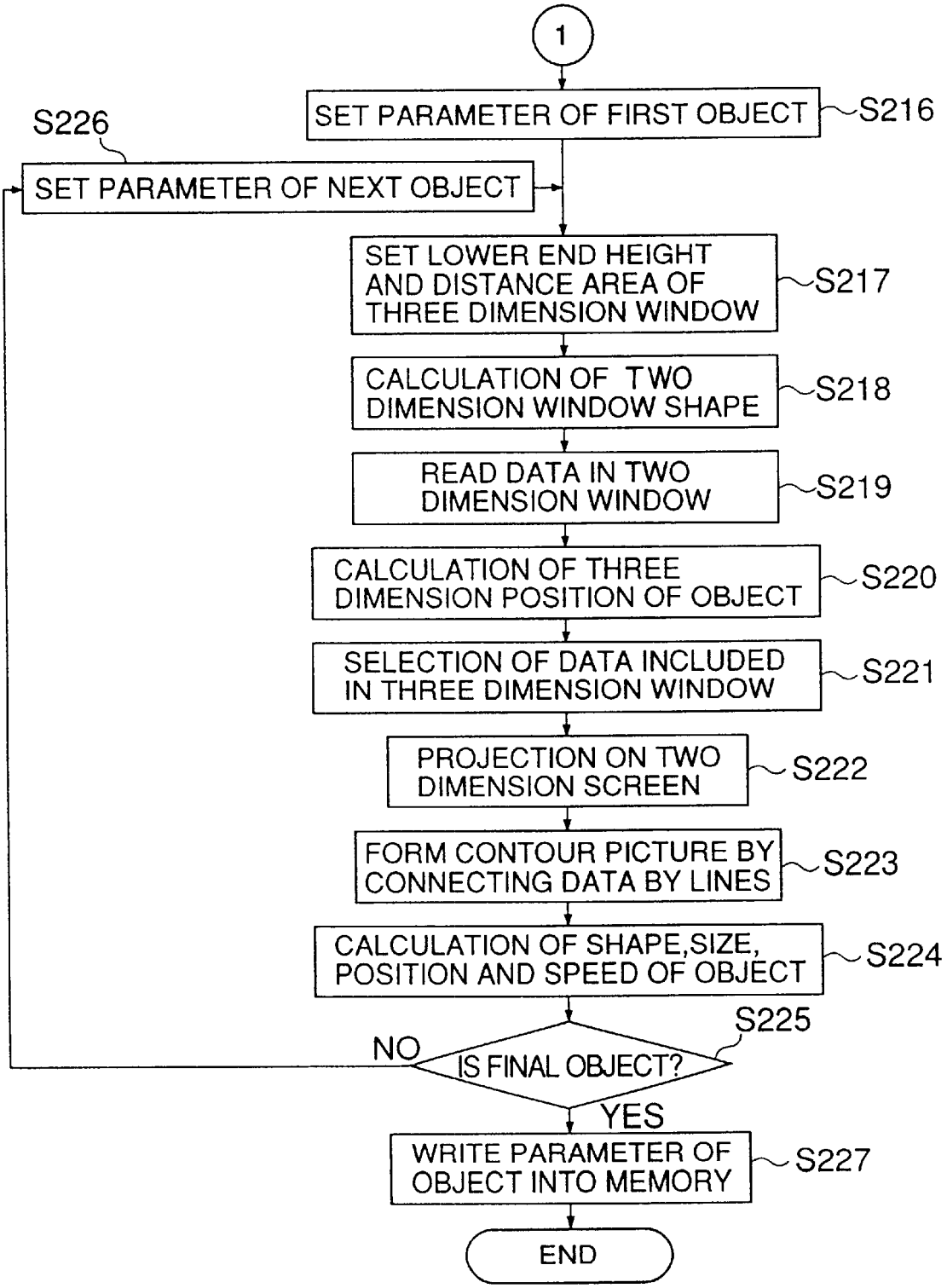

On the other hand, flow charts of FIGS. 35 and 36 show an object detection processing executing in the microprocessor 120a. In step S201, a position of the road surface is set. In step S202, the distance picture from the image processor 20 is divided into a grating shape regions. In step S203, the data are read for the initial region.

Next, the processing advances to step S204, and the initial data in the region are set. In step S205, the calculation is performed about the three dimensional position (X, Y, Z) of the object, namely, the distance and height. After the height of the road surface is calculated at the distance Z in step S206, the data over the road surface are selected in step S207.

In step S208, the data are checked as to whether the data are final data or not. When the data are not the final data, next data in the region are set in step S209 to return process to the above mentioned step S205 so as to continue the processing. When the data are the final data, the process advances from step S208 to step S210.

In step S210, a histogram is formed. In step S211, there is detected section in which a degree of the histogram is over the judge value and becomes the maximum value. When the section is detected in which the degree of the histogram is over the judge value and becomes the maximum value, the object exists in the section in step S212 so as to detect the distance to the object.

In step S213, there is studied as to whether the region is the final region or not. When the region is not final, the data in the next region are read in step S214 to return to the step S204 so as to continue the same processing. When the region is final, the process advances to step S215 to detect the distance and existing region of the object so as to end the detection to advance the process to step S216.

In Step S216, a parameter is set for the initial object. In step S217, the three dimensional window $WD_3$ is set for the height of its lower end and the distance area. In step S218, the shape of the two dimensional window $WD_2$ is calculated in dependency on the three dimensional window $WD_3$ to advance the processing to step S219.

In step S219, the data are read from the two dimensional window $WD_2$. After calculating the three dimensional position of the object in step S220, the data are selected and extracted from the three dimensional window $WD_3$ in step S221.

After that, when the data extracted in step S221 are projected on the two dimensional picture in step S222, a contour image is formed by connecting each data by lines in step S223. Next, in step 224, the shape, size, position and speed of the object are calculated. In step S225, there is checked whether the object is final or not.

When the object is not final, a parameter of the next object is set in step S226 to return to step S217. When the object is final, in step S227, parameters such as a position, shape, speed, acceleration and possibility of collision of the object are read in the output memory 125 to complete the process.

Figure 37:
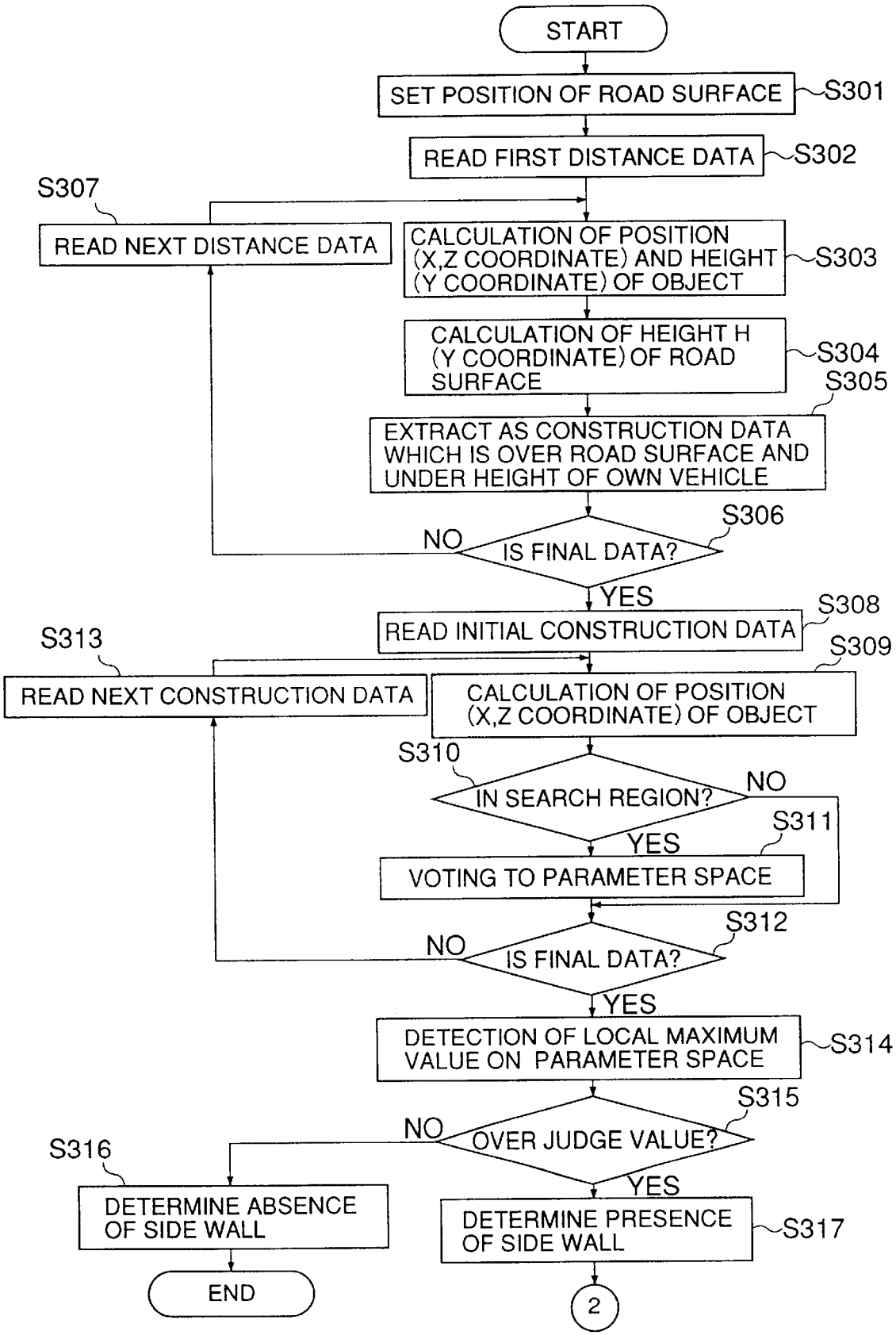
FIGS. 37 and 38 are flow charts of side wall detection processing, respectively.
Figure 38:
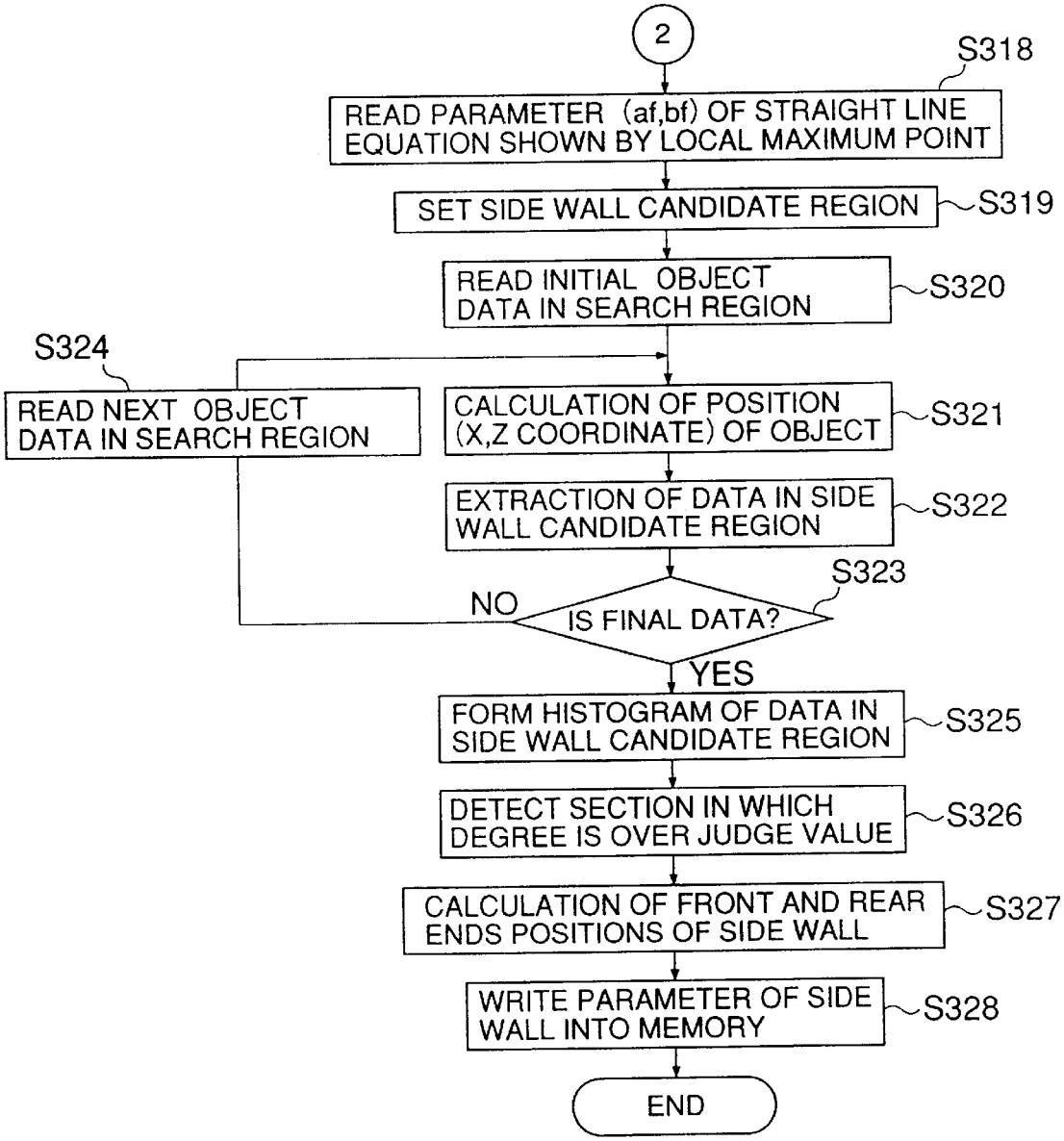

Furthermore, the microprocessor 120b performs the side wall detection process shown in FIGS. 37 and 38 in parallel with the object detection process by the microprocessor 120a. In this side wall detection process, when the road surface position is set in step S301, the initial distance data are read from the distance picture in step S302.

Next, in step S303, the position (X, Z coordinates) and the height (Y coordinate) of the object are calculated. In step S304, the height H (Y coordinate) is calculated with respect to the road surface in the distance Z. In step S305, the data over the road surface and under the height of the vehicle are extracted as the construction data.

In step S306, the data are investigated to be final or not. When the data are not final, the next distant data are read in step S307 and the process returns to step S303 to repeat the process again. When the data is final, the process advances from step S306 to step S308.

In step S308, the initial construction data are read, and in step S309, the position (X, Z coordinates) of the object is calculated. In step S310, the calculated position (X, Z coordinates) is checked to be within the search region or not.

When the calculated position (X, Z coordinates) is without the search region, the process jumps from steps S310 to S312. When the position is in the search region, the process advances from step S310 to step S311 to vote into the parameter space to be in step S312.

In step S312, the processed construction data are checked as to be the final data or not. When the data are not final, the next construction data are read in step S313 to repeat the same process from step S309, when the data are final, the process advances to step S314 to detect the local maximum value in the parameter space.

Next, at advancing to the step S315, the detected local maximum value is checked to be over the judge value or not. When the value is under the judge value, the side wall is determined to be absent in step S316. When the value is over the judge value, the side wall is determined to be present in step S317. Then, the process advances to step S318.

In step S318, there is a reading process for a parameter corresponding to the grating of the local maximum value detected in step S314, namely, a parameter (af, bf) of the linear equation showing the local maximum point. Next, the side wall candidate region is set in step S319.

In step S320, the initial structure data are read from the search region. After the position (X, Z coordinates) of the object is calculated in step S321, the data including in the side wall estimated region are extracted in step S322. After that, in step S323, the processed data are investigated to be the final data within the search region or not.

When the data are not final, the process is divided from step S323 to step S324 to read the next structure data in the search region to return to step S321. When the data are final in the search region, the process advances from step S323 to step S325 to form the histogram by using the data in the side wall estimated region.

Next, in step S326, the degree of the formed histogram is detected to be the section over the judge value to be in step S327. In step S327, the three dimensional position of both ends of the section in which the degree of the histogram is over the judge value is calculated. In step S328, the program is completed by writing the parameters such as a presence or absence, position and direction of the side wall, and positions of front and rear ends into the output memory 125. The program is first executed on the left side wall, and then on the right side wall.

Figure 39:
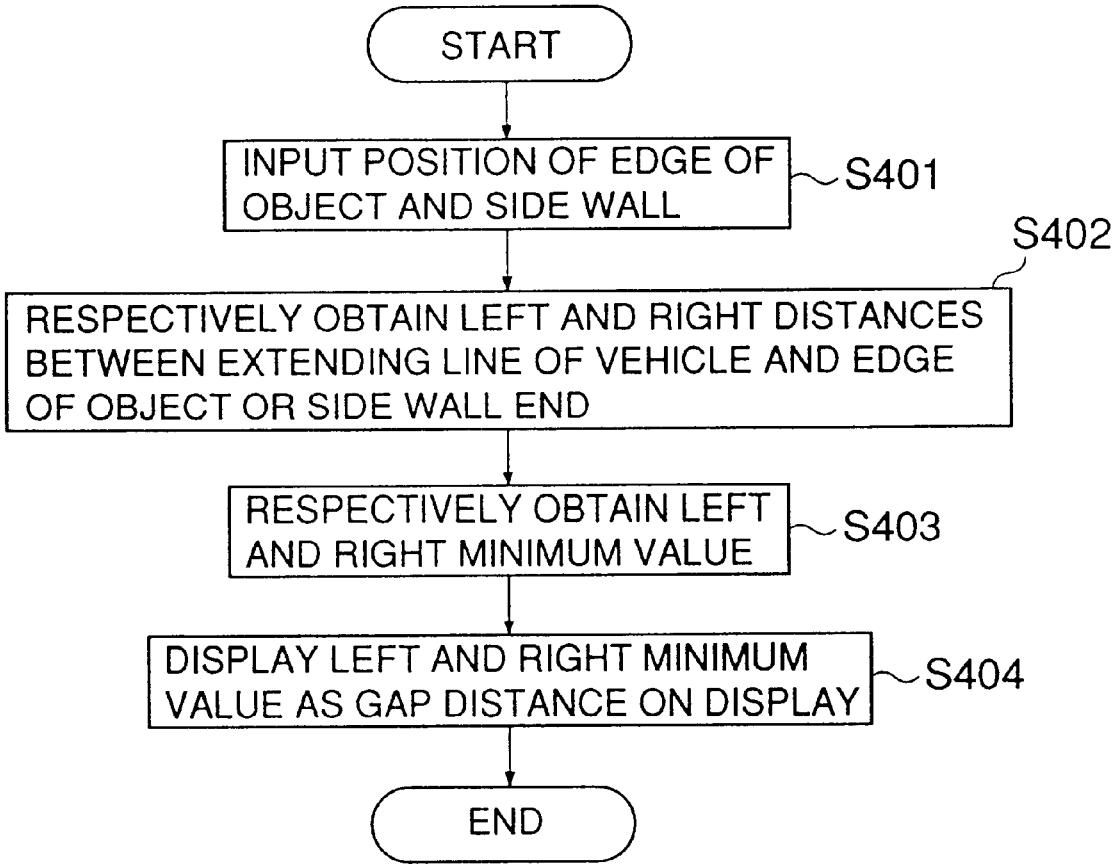
FIG. 39 is a flow chart of gap distance calculation processing.

By the above process, it is possible to detect the position and size of the front wall and parked car from the own vehicle 1, and it is possible to prosecute the program for processing the gap distance calculation shown in FIG. 39 by the microprocessor 120c.

In the gap distance calculation processing, in step S401, there are inputted the position of the edge of the object on the vehicle side and the position of the end of the side wall. Then, in step S402, the right and left distances are respectively obtained in the X direction between the end of the side wall or each edge of the objects and the executed line of the side portion of the vehicle 1.

Next, in step S403, the right and left minimum values are respectively obtained from the each of distances obtained in the step S402. In step S404, a little clearance as the gap distance is added with each of the right and left minimum values to display the numerical value on the display 3 through the display controller 126.

What is claimed is:

1. A running guide apparatus for a vehicle having a pair of cameras mounted on a front portion of said vehicle for taking a three-dimensional picture of objects in front of the vehicle and for generating a picture signal, said apparatus comprising:

stereoscopic picture processing means responsive to said picture signal for processing a pair of stereoscopic pictures of said object outside said vehicle and for producing a distance signal by obtaining a distance distribution of an entire picture in dependency upon a discrepancy amount positions corresponding to said pair of the stereoscopic pictures in accordance with a principle of a triangulation;

object detection means responsive to said distance signal for detecting a plurality of various objects by using three dimensional position data calculated with each portion of the object corresponding to the distance distribution and for generating a distance signal;

gap distance calculation means responsive to a distribution signal for respectively calculating a nearest distance of right and left gap distances each between an extended line of right or left side of the vehicle and each end of the vehicle side from the plurality of various objects and for producing a distance signal; and information means responsive to said distance signal for informing a driver of data related to the right and left gap data so as to entirely and exactly display surrounding conditions of said vehicle and to largely decrease burdens of said driver when running on a narrow road.

2. The running guide apparatus for the vehicle according to claim 1, further comprising two pairs of charge coupled device (CCD) cameras respectively arranged as said imaging system to a front surface of said vehicle with a predetermined interval, one pair provided for a long distance and the provided for a short distance, and each pair including a right and left cameras each other;

an image processor provided as said stereoscopic picture processing means, and including a distance detection circuit for searching a portion in which a same object is imaged in each small region of the stereoscopic picture pair from said CCD cameras and for calculating a distance to the object by obtaining a discrepancy amount of a position corresponding to said portion, and a distance picture memory for storing distance data outputted from said distance detection circuit;

a distance picture processing computer provided as said object detection means and said gap distance calculation means, and comprised of a multi-microprocessor system construction including a first microprocessor for mainly performing detection processing of individual object, a second microprocessor for mainly performing detection processing of a side wall, a third microprocessor for mainly performing calculation processing of a gap distance, and a system bus for connecting said first through third microprocessors in parallel; and a discrepancy as said information means for displaying to a driver gap data by obtaining said calculation processing of said gap distance.

3. The running guide apparatus for the vehicle according to claim 2, further comprising an object recognizer comprised of said first microprocessor;

a side wall detector comprised of said second microprocessor;

a gap distance calculator comprised of said third microprocessor;

a construction parameter memory for storing a processed result of said object recognizer and said side wall detector to output said result to said gap distance calculator.

4. The running guide apparatus for the vehicle according to claim 3, further comprising object detector for dividing the distance picture from a distance picture memory comprised of said image processor into a predetermined interval in the stripe shape and for selecting only construction data having the danger as an object for running to calculate the detected distance;

a three dimension window generator for setting a three dimensional space region of a rectangular solid shape with respect to respective object detected by said object detector, and for calculating how to be shown set three dimension window on a two dimensional picture, so as to set the detection object with respect to only data within a window contour line as the two dimension window; and an object contour extractor for surveying one by one each of the data in the two dimension window, for selecting only data included in said three dimension window, extracting a contour image of the detected object, and for detecting a positional relationship between the detected object and vehicle own body.

5. The running guide apparatus for the vehicle according to claim 4, further comprising:

an object data extractor for extracting only data over the predetermined road surface previously set from the distance distribution data supplied from a distance picture memory comprised of said image processor;

a side wall straight line detector for extracting only data within a side wall search region previously set, for processing the extracted data by the Hough transformation, thereby detecting a linear equation showing presence or absence of the side wall and the position of the side wall; and a side wall area detector for setting the side wall candidate region in which the side wall is estimated to exist on the basis of the straight line showing the position of the side wall, and for detecting the positions of before and after ends of the side wall in dependency on the distribution condition of the construction data in the side wall candidate region.

6. A running guide method for a vehicle having a pair of cameras mounted on a front portion of said vehicle for taking a three-dimensional picture of objects in front of the vehicle and for generating a picture signal, said apparatus comprising:

a step of processing a pair of stereoscopic pictures of said object outside said vehicle to produce a distance signal by obtaining a distance distribution of an entire picture in dependency upon a discrepancy amount positions corresponding to said pair of the stereoscopic pictures in accordance with a principle of a triangulation;

a step of detecting a plurality of various objects by using three dimensional position data calculated with each portion of the object corresponding to the distance distribution and for generating a distance signal;

a step of respectively calculating a nearest distance of right and left gap distances each between an extended line of right or left side of the vehicle and each end of the vehicle side from the plurality of various objects; and a step of informing a driver of data related to the right and left gap data so as to entirely and exactly display surrounding conditions of said vehicle and to largely decrease burdens of said driver when running on a narrow road.

7. The running guide method for the vehicle according to claim 6, further comprising a step of obtaining long distance data of a picture in front of the vehicle;

a step of obtaining short distance data of a picture in front of the vehicle;

a step of searching a portion in which a same object is imaged in each small region of the stereoscopic picture pair from said CCD cameras;

a step of calculating a distance to the object by obtaining a discrepancy amount of a position corresponding to said portion, and a distance picture memory for storing distance data outputted from a distance detection circuit;

a step of performing detection processing of a side wall, a third microprocessor for mainly performing calculation processing of a gap distance, and a system bus for connecting said first through third microprocessors in parallel; and a step of displaying to a driver gap data by obtaining said calculation processing of said gap distance.

8. The running guide apparatus for the vehicle according to claim 7, further comprising a step of dividing the distance picture from a distance picture memory comprised of a image processor into a predetermined interval in the strip shape;

a step of selecting only construction data having the danger as an object for running to calculate the detected distance;

a step of setting a three dimensional space region of a rectangular solid shape with respect to respective object detected by said object detector;

a step of calculating how to be shown set three dimension window on a two dimensional picture, so as to set the detection object with respect to only data within a window contour line as the two dimension window;

a step of surveying one by one each of the data in the two dimension window;

a step of selecting only data included in said three dimension window;

a step of extracting a contour image of the detected object; and a step of detecting a positional relationship between the detected object and vehicle own body.

9. The running guide apparatus for the vehicle according to claim 8, further comprising a step extracting only data over the predetermined road surface previously set from the distance distribution data supplied from a distance picture memory comprised of said image processor;

a step of extracting only data within a side wall search region previously set;

a step of processing the extracted data by the Hough transformation, thereby detecting a linear equation showing presence or absence of the side wall and the position of the side wall;

a step of setting the side wall candidate region in which the side wall is estimated to exist on the basis of the straight line showing the position of the side wall; and a step of detecting the positions of before and after ends of the side wall in dependency on the distribution condition of the construction data in the side wall candidate region.

*10. A driving guide apparatus for a vehicle having a pair of cameras mounted on a front portion of said vehicle and arranged to take pairs of image pictures of a scene containing objects which may form obstacles in front of the vehicle and for generating picture signals, said apparatus comprising:*

*image picture processing means for processing a pair of image pictures of objects outside said vehicle for producing a distance distribution picture made up by the distribution of an object point distance from said pair of cameras in dependence upon a discrepancy amount between the imaged object points within said pair of image pictures in accordance with a principle of triangulation;*

*object detection means for detecting objects constituting a potential obstacle by calculating three dimensional positions for said object from the distance distribution picture;*

*gap distance calculation means for calculating a gap distance between an extended line of a side of the vehicle and one of said detected objects nearest said vehicle; and*

*information means for informing a driver of data related to the gap distance so as to decrease the burdens of said driver when driving on a narrow road.*

*11. The driving guide apparatus according to claim 10, wherein said gap distance calculation means calculates said gap distance on each side of said vehicle.*

*12. The driving guide apparatus according to claim 10, wherein said information means comprises a display provided to inform said driver of said gap distance so as to be entirely and precisely display lateral obstacles in the traveling direction of said vehicle to said driver.*

*13. The driving guide apparatus according to claim 10, wherein said object detection means comprises:*

*an object recognizer provided to recognize obstacles on a road as said objects; and*

*a side wall detector provided to detect a side wall on a side of said road as said object; and*

*wherein said gap distance calculation means calculates a distance to each of said obstacle and said side wall from said vehicle to detect said gap distance.*

*14. The driving guide apparatus according to claim 13, wherein said object recognizer comprises:*

*an object detector provided to divide said distance distribution picture in a stripe shape by a predetermined interval and select only obstacles as said objects;*

*a three dimension window generator provided to set a three dimension space region of a rectangular solid shape with respect to each obstacle detected by said object detector; and*

*an object contour extractor provided to select data existing within said three dimension window to extract a contour image of said detected obstacle, said contour image being used to calculate a distance between said detected obstacle and said vehicle.*

*15. The driving guide apparatus according to claim 13, wherein said wall detector comprises:*

*an object data extractor provided to extract data indicative of potential objects over a road surface from said distance distribution picture;*

*a side wall straight line detector provided to process the extracted data to determine a straight line with a linear equation representing the position of a side wall; and*

*a side wall area detector provided to determine positions of ends of said side wall in dependence on a volume of data within a side wall candidate region set around said straight line.*

*16. The driving apparatus for the vehicle according to claim 10, further comprising:*

*two pairs of charge coupled device (CCD) cameras respectively arranged as said imaging system to a front surface of said vehicle with a predetermined interval, one pair is provided for a long distance and the other provided for a short distance, and each pair including a right camera and a left camera;*

*an image processor provided as said image picture processing means, and including a distance detection circuit for searching a portion in which a same object is imaged in each small region of the image picture pair from said CCD cameras and for calculating a distance to the object by obtaining a discrepancy amount of a position corresponding to said portion, and a distance picture memory for storing distance data output from said distance detection circuit;*

*a distance picture processing computer provided as said object detection means and said gap distance calculation means, and comprised of a multi-microprocessor system construction, including a first microprocessor for mainly performing detection processing of an individual object, a second microprocessor for mainly performing detection processing of a side wall, a third microprocessor for mainly performing calculation processing of a gap distance, and a system bus for connecting said first through third microprocessors in parallel; and*

*a display as said information means for displaying to a driver gap data by obtaining said calculation processing of said gap distance.*

*17. The driving guide apparatus for a vehicle according to claim 16, further comprising:*

*an object recognizer comprised of said first microprocessor;*

*a side wall detector comprised of said second microprocessor;*

*a gap distance calculator comprised of said third microprocessor;*

*a construction parameter memory for storing a processed result of said object recognizer and said side wall detector to output said result to said gap distance calculator.*

*18. The driving guide apparatus for the vehicle according to claim 17, further comprising:*

*an object detector for dividing the distance picture from a distance picture memory comprised of said image processor into a predetermined interval in a stripe shape and for selecting only object data having the danger to be an obstacle to calculate the detected distance;*

*a three dimension window generator for setting a three dimensional space region of a rectangular solid shape with respect to a respective object detected by said object detector, and for calculating how to be shown a set three dimension window on a two dimensional picture, so as to set the detected object with respect only to data within a window contour line as the two dimension window; and*

*an object contour extractor for surveying one by one each of the data in the two dimension window, for selecting only data included in said three dimension window, extracting a contour image of the detected object, and for detecting a positional relationship between the detected object and the vehicle's own body.*

*19. The driving guide apparatus for the vehicle according to claim 16, further comprising:*

*an object data extractor for extracting only data over the predetermined road surface previously set from the distance distribution data supplied from a distance picture memory comprised of said image processor;*

*a side wall straight light detector for extracting only data within a side wall search region previously set, and for processing the extracted data by the Hough transformation, thereby detecting a linear equation showing the presence or absence of the side wall and the position of the side wall; and*

*a side wall area detector for setting the side wall candidate region in which the side wall is estimated to exist on the basis of the straight line showing the position of*

*the side wall, and for detecting the positions of ends of the side wall in dependency on the distribution condition of the construction data in the side wall candidate region.*

*20. A driving guide method for a vehicle having a pair of cameras mounted on a front portion of said vehicle and provided to take a pair of image pictures of a scene in front of the vehicle containing objects which may form obstacles and for generating a picture signal, said method comprising the steps of:*

*processing a pair of image pictures of said objects outside said vehicle and producing a distance distribution picture made up by a distribution of object point distances from said cameras in dependency upon discrepancy amounts between imaged object points within said pair of image pictures using a principle of triangulation;*

*detecting a plurality of objects constituting a potential obstacle by using three dimensional positions for said objects from the distance distribution picture;*

*calculating a gap distance each between an extended line of a side of the vehicle and a detected object nearest to said vehicle; and*

*informing a driver of data related to said gap distance so as to largely decrease burdens of said driver when running on a narrow road.*

*21. The driving guide method for the vehicle according to claim 20, further comprising the steps of:*

*obtaining long distance data of a picture in front of the vehicle;*

*obtaining short distance data of a picture in front of the vehicle;*

*searching a position in which a same object is imaged in each small region of the image picture pair from CCD cameras;*

*calculating a distance to the object by obtaining a discrepancy amount of a position corresponding to said portion;*

*performing detection processing of a side wall; and*

*displaying to a driver gap data by obtaining said calculation of said gap distance.*

*22. The driving guide method for the vehicle according to claim 20, further comprising the steps of:*

*dividing the distance picture from a distance picture memory comprised of an image processor into a predetermined interval in the stripe shape;*

*selecting only construction data having the danger to be an obstacle for the vehicle to calculate the detected distance;*

*setting the dimensional space region of a rectangular solid shape with respect to a respective object detected by said object detector;*

*calculating how to show a set three dimension window on a two dimensional picture, so as to set the detected object with respect only to data within a window contour line as the two dimension window;*

*surveying one by one each of the data in the two dimension window;*

*selecting only data included in said three dimension window;*

*extracting a contour image of the detected object; and*

*detecting a positional relationship between the detected object and vehicle's own body.*

*23. The driving guide method for the vehicle according to claim 20, further comprising the steps of:*

*extracting only data over the predetermined road surface previously set from the distance distribution data supplied from a distance picture memory comprised of said image processor;*

*extracting only data within a side wall search region previously set;*

*processing the extracted data by the Hough transformation, thereby detecting a linear equation showing the presence or absence of the side wall and the position of the side wall;*

*setting the side wall candidate region in which the side wall is estimated to exist on the basis of the straight line showing the position of the side wall; and*

*detecting the positions of ends of the side wall in dependency on the distribution condition of the construction data in the side wall candidate region.*

*24. A driving apparatus for a vehicle, comprising:*

*imaging means mounted on a front portion of said vehicle and provided to generate image data of a scene in front of said vehicle, containing objects which may constitute potential obstacle;*

*object detection means for detecting objects constituting a potential obstacle by processing said image data;*

*gap distance calculation means for calculating a gap distance ($D_x$, $D_y$) between an extended line of a side of said vehicle and a side edge of one of said detected objects; and*

*information means for informing a driver of a status related to said gap distance so as to largely decrease burdens of the driver when driving on a narrow road.*

* * * * *